(12) United States Patent
Bando et al.

(10) Patent No.: US 11,223,310 B2
(45) Date of Patent: Jan. 11, 2022

(54) VARIABLE SPEED GENERATOR/MOTOR DEVICE

(71) Applicants: HITACHI MITSUBISHI HYDRO CORPORATION, Tokyo (JP); HITACHI, LTD., Tokyo (JP)

(72) Inventors: Akira Bando, Tokyo (JP); Takashi Oyake, Tokyo (JP); Masaya Ichinose, Tokyo (JP)

(73) Assignees: HITACHI MITSUBISHI HYDRO CORPORATION, Tokyo (JP); HITACHI, LTD., Tokyo (JP)

( * ) Notice: Subject to any disclaimer, the term of this patent is extended or adjusted under 35 U.S.C. 154(b) by 0 days.

(21) Appl. No.: 15/734,952

(22) PCT Filed: Jun. 6, 2019

(86) PCT No.: PCT/JP2019/022626
§ 371 (c)(1),
(2) Date: Dec. 3, 2020

(87) PCT Pub. No.: WO2019/235595
PCT Pub. Date: Dec. 12, 2019

(65) Prior Publication Data
US 2021/0234487 A1 Jul. 29, 2021

(30) Foreign Application Priority Data
Jun. 7, 2018 (JP) .............................. JP2018-109806

(51) Int. Cl.
*H02P 6/14* (2016.01)
*H02P 23/14* (2006.01)
(Continued)

(52) U.S. Cl.
CPC ................ *H02P 23/14* (2013.01); *H02P 9/02* (2013.01); *H02P 27/06* (2013.01)

(58) Field of Classification Search
CPC ............. H02P 23/14; H02P 9/02; H02P 27/06
(Continued)

(56) References Cited

U.S. PATENT DOCUMENTS 8,233,300 B2   7/2012   Dommaschk et al.
8,422,260 B2   4/2013   Asplund
(Continued)

FOREIGN PATENT DOCUMENTS

JP   S57-088881 A   6/1982
JP   S62-247776 A   10/1987
(Continued)

OTHER PUBLICATIONS

M. Hagiwara et al., "A Medium-Voltage Motor Drive With a Modular Multilevel PWM Inverter Part I. Experimental Verification by a 400-V, 15-KW Downscaled Model," IEEJ IA, vol. 130, No. 4, 2010, p. 544 Preface line1-25.
(Continued)

*Primary Examiner* — Erick D Glass
(74) *Attorney, Agent, or Firm* — McDermott Will & Emery LLP

(57) ABSTRACT

In a variable speed generator/motor device including a variable frequency power converter, a direct current voltage device including a voltage type self-excited converter, an automatic voltage adjuster, and a converter current adjuster that controls unit converters, a first three-phase branch circuit is provided between the direct current voltage device and an alternating current system; a second three-phase branch circuit is provided between the variable frequency power converter and a three-phase alternating current synchronous machine; a first load switch is provided between the first three-phase branch circuit and the second three-phase branch circuit; a measurement current transformer is provided between the three-phase alternating current syn-
(Continued)

chronous machine and the second three-phase branch circuit; when switching from a converter mode in which the variable frequency power converter drives the three-phase alternating current synchronous machine to generate power to a bypass mode, the first load switch is closed to stop a gate command to the unit converters; and when switching from the bypass mode to the converter mode, a current command value of the converter current adjuster is calculated from a current value of the measurement current transformer, the gate command to the unit converters is started, and the first load switch is opened.

12 Claims, 21 Drawing Sheets

(51) Int. Cl.
*H02P 9/02* (2006.01)
*H02P 27/06* (2006.01)

(58) Field of Classification Search
USPC .................................................... 318/400.26
See application file for complete search history.

(56) References Cited

U.S. PATENT DOCUMENTS

| | | |
|---|---|---|
| 8,792,261 B2 | 7/2014 | Inoue et al. |
| 9,461,560 B2 | 10/2016 | Inoue et al. |
| 9,917,534 B2 | 3/2018 | Inoue et al. |
| 10,425,027 B2 | 9/2019 | Mori et al. |
| 10,536,104 B2 | 1/2020 | Bando et al. |
| 10,784,808 B2 | 9/2020 | Bando et al. |
| 2004/0080164 A1 | 4/2004 | McKelvey et al. |
| 2013/0241463 A1* | 9/2013 | Bando ............... H02P 9/102 318/810 |
| 2018/0034399 A1* | 2/2018 | Bando ............... H02M 7/48 |
| 2020/0091831 A1* | 3/2020 | Kadota ............. H02M 3/3376 |

FOREIGN PATENT DOCUMENTS

| | | |
|---|---|---|
| JP | 2002-89286 A | 3/2002 |
| JP | 2003-088190 A | 3/2003 |
| JP | 2003-232228 A | 8/2003 |
| JP | 5045053 B2 | 10/2012 |
| JP | 5189105 B2 | 4/2013 |
| JP | 5268739 B2 | 8/2013 |
| JP | 5537095 B2 | 7/2014 |
| JP | 6243083 B2 | 12/2017 |
| JP | 6246753 B2 | 12/2017 |
| WO | 2009/135523 A1 | 11/2009 |
| WO | 2016/136682 A1 | 9/2016 |

OTHER PUBLICATIONS

I. Hasegawa et al., "Development of transformerless multilevel high voltage inverter," Meiden Jiho vol. 352 2016, No. 3.
"High voltage inverter contributing to power leveling in pumped storage power plant," Yaskawa News, No. 289, pp. 9, 2009.
International Search Repot issued in corresponding International Patent Application No. PCT/JP2019/022626, dated Sep. 3, 2019, with English translation.

* cited by examiner

VARIABLE SPEED GENERATOR/MOTOR DEVICE

CROSS-REFERENCE OF RELATED APPLICATIONS

This application is a National Stage of PCT International Application No. PCT/JP2019/022626 filed on Jun. 6, 2019 which designates the United States, incorporated herein by reference, and which is based upon and claims the benefit of priority from Japanese Patent Application No. 2018-109806 filed on Jun. 7, 2018, the entire contents of which are incorporated herein by reference.

FIELD

The present invention relates to a variable speed generator/motor device obtained by connecting a pulse-width modulated (PWM) power converter to an alternating-current rotary electric machine.

BACKGROUND

In a variable speed generator/motor device in which a frequency converter connected back-to-back to a direct-current end of a voltage type self-excited converter (hereinafter, called "VSC converter" in the present invention) that converts power between an alternating current and a direct current by applying pulse-width modulation to a power semiconductor switching element (hereinafter, called "switching element" in the present invention) having a self-turn-off function is connected between an alternating current system and an alternating-current rotary electric machine (hereinafter, called "FPC system" in the present invention), the frequency converter has been improved in price-to-performance ratio. As a result, application of the variable speed generator/motor device to renewable energy generation systems such as wind power systems is expanding.

As a result of development of a modular multilevel PWM converter (hereinafter, called "MMC converter" in the present invention) that is one of the VSC converters, a high-capacity, high-voltage generator/motor can be directly connected to the frequency converter without interposing a transformer therebetween, so that the application of the FPC system is expected to expand.

FIG. 16 illustrates a circuit of an arm converter included in the MMC converter. The arm converter is constituted by a two-terminal converter obtained by connecting k unit converters in series. Each of the unit converters controls a modulation factor of a PWM converter-having a capacitor as a voltage source to generate a desired voltage. The voltage of the capacitor varies with charge and discharge at a period determined by an alternating current frequency.

Patent Literature 1 discloses a system in which two sets of three-phase half-wave circuits each obtained by star connection of three arm converters are provided, the star connection is used as two direct current terminals, and a circulating current reducing reactor is provided between the other terminal of an arm of each of the phases and an alternating current terminal (hereinafter, called "DSMMC converter" in the present invention).

Non Patent Literature 1 discloses a method of providing a variable frequency power supply by back-to-back connection of direct current terminals of two DSMMC converters, and providing a variable speed motor device by connecting one alternating current terminal to an alternating current system and connecting the other alternating current terminal to an alternating-current rotary electric machine.

Patent Literature 2 discloses a method of canceling a direct current magnetomotive force of a transformer core caused by a circulating current by providing two sets of three-phase half-wave circuits each obtained by star connection of three arm converters, using the star connection as two direct current terminals, connecting the other terminal of an arm of each of the phases to a transformer provided with secondary and tertiary windings connected into a double star connection, and using leakage reactance of the secondary and tertiary windings as a current reduction element (hereinafter, called "DIMMC converter" in the present invention).

Patent Literature 3 discloses a method of canceling out the direct current magnetomotive force of the transformer core caused by the circulating current by providing a three-phase half-wave circuit obtained by star connection of three am converters, using the star connection portion as a first terminal of a direct current, providing a transformer provided with secondary and tertiary windings and using a zigzag star connection portion as a second terminal of the direct current, and using leakage reactance of the secondary and tertiary windings connected in a zigzag form as a current reduction circuit element (hereinafter, called "ZCMMC converter" in the present invention).

Patent Literature 4 discloses an FPC system using the above-described three types of the MMC converters in configurations illustrated in FIGS. 17A, 17B, and 17C. Patent Literature 4 discloses that in the case of the DIMMC converter, the DIMMC converter needs to have two sets of three-phase alternating current windings each having a 60-degree phase band, and that in the case of the ZCMMC converter, the ZCMMC converter needs to have three-phase alternating current windings having a 120-degree phase band. Patent Literature 4 also discloses a method of starting a synchronous generator/motor taking into account a "reduction in output in a low-frequency region", which is a disadvantage of the MMC converter.

CITATION LIST

Patent Literature

Patent Literature 1: Japanese Patent No. 5189105
Patent Literature 2: International Publication No. 2009/135523
Patent Literature 3: Japanese Patent No. 5268739
Patent Literature 4: Japanese Patent No. 6243083
Patent Literature 5: Japanese Patent Application Laid-open No. 2003-88190
Patent Literature 6: Japanese Patent No. 6246753
Patent Literature 7: Japanese Patent No. 5537095
Patent Literature 8: Japanese Patent No. 5045053
Patent Literature 9: Japanese Patent Application Laid-open No. S57-88881
Patent Literature 10: Japanese Patent Application Laid-open No. S62-247776
Non Patent Literature 1: Makoto HAGIWARA, Kazutoshi NISHIMURA, Yasufumi AKAGI, "High Voltage Motor Drive CJsing Modular Multilevel PWM Inverter: First Report-Experimental Verification Using 400 V, 15 kW Mini Model", The transactions of the Institute of Electrical Engineers of Japan D, April 2010, Volume 130, No. 4, pp. 544-551
Non Patent Literature 2: Isamu HASEGAWA, Shizunori HAMADA, Kenji KOBORI, Yutaka SHOJI, "Development of Transformerless Multilevel High Voltage Inverter", Meiden Jiho, 2016, No. 3, pp. 34-39

Non Patent Literature 3: "High Voltage Inverters Contributing to Power Leveling at Pumped Storage Power Plants", Yaskawa News, No. 289, pp. 9

SUMMARY

Technical Problem

As a method for obtaining the variable speed generator/motor device, a secondary excitation system (hereinafter, called "DFS system" in the present invention) has been developed earlier in which a branch point is provided between the alternating current system and an armature winding of a wound-rotor induction machine, and the frequency converter is connected between the branch point and an excitation winding of the wound-rotor induction machine. In the case of the DFS system, a capacity of the frequency converter is determined by a variable speed range centered on a synchronous speed. Therefore, the DFS system has an advantage of being smaller than a generator/motor.

Examples of the power conversion device include, in addition to the VSC converter, a separately excited current type converter (hereinafter, called "LCC converter" in the present invention) that uses a switching element, such as a thyristor, having no self-turn-off function. The LCC converter has a disadvantage of consuming reactive power, but has an advantage of being capable of economically continuing to operate when a system accident has spread, because the switching element has a higher short term overcurrent withstand capability than that of a self-turn-off element that is limited by an instantaneous value of an interrupting current.

In the case of the DFS system, the capacity of the generator/motor is increased to compensate the reactive power consumed by the LCC converter. However, an opinion is strongly argued that this increase in capacity is within an allowable range if the variable speed range is equal to or narrower than ±10%.

For example, if the variable speed range is ±8%, the capacity of the LCC converter is 15% of the capacity of the generator. Moreover, the capacity of the generator/motor is higher by 5% than in the case where the VSC converter is applied.

A reduction in efficiency of the generator/motor device caused by a total loss generated by the LCC converter and the excitation transformer can be reduced to 0.2% or below. A loss generated by the LCC converter can be reduced to 0.1% or below, which is a conventional stray load loss.

In the case of the FPC system, if the efficiency of the VSC converter including a harmonic filter device is 98%, the combined efficiency of the VSC converter and the generator/motor is reduced by 2% because the capacity of the VSC converter is equal to the capacity of the generator/motor. This reduction in efficiency is 10 times that of the DFS system. If a step-up transformer is connected between the generator/motor and the VSC converter, the efficiency reduction further increases.

If the FPC system is applied to a hydroelectric power generation field, in many cases, an annual amount of electrical energy lost by loss of the maximum turbine efficiency at a rated output caused by a frequency converter loss cancels out most of an increase in the turbine efficiency resulting from a reduction in speed of the frequency converter.

Patent Literature 5 discloses a system of providing a bypass switch in the frequency converter, and having a mode of operating at an optimal speed of an engine via the frequency converter (hereinafter, called "converter operation" in the present invention), and an operation mode of bypassing the frequency converter and directly connecting to the alternating current system to minimize the loss of electrical equipment (hereinafter, called "bypass operation" in the present invention).

Patent Literature 6 discloses that a frequency converter having the same configuration as that of Patent Literature 5 and including a bypass switch using "two breakers" or "one breaker and one semiconductor switch" is applied to a hydroelectric power generation system, and discloses a variable speed operation control device that provides a period in which no current of a generator flows during switching, performs a bypass operation during a normal condition, performs a converter operation in cases of below the minimum flow rate, the minimum head, and the minimum output, and reduces the rotational speed in the converter operation to contribute to improvement in power generation efficiency. Patent Literature 6 claims that this configuration can "provide a variable speed generator/motor device using a frequency converter having a lower capacity than that of a generator".

Patent Literature 9 and Patent Literature 10 disclose a method of providing a commutation period during switching between the bypass operation and the converter operation and ensuring continuity of a current of a synchronous machine having an excitation winding.

Patent Literature 8 discloses a method in which methods of Patent Literature 9 and Patent Literature 10 are used, and in order to join the synchronous motor in parallel to the system in a shockless manner while driving the synchronous motor using the VSC converter, the current of the VSC converter is controlled so as to make a phase difference obtained by coordinate transformation of a system voltage and a motor voltage to be zero.

Non Patent Literature 3 discloses a method in which methods of Patent Literature 9 and Patent Literature 10 are used, and switching is made from a high-voltage inverter for starting pumped storage power generation to a commercial power supply in a shockless manner. However, Non Patent Literature 3 discloses neither time nor method of switching from an excitation control method during driving of the high-voltage inverter (excitation current control generally called AER) to an excitation control method during operation using the commercial power (automatic voltage control generally called AVR). Although Non Patent Literature 3 discloses a method of stopping the high-voltage inverter after opening a breaker on the inverter side, this method does not allow the shockless switching in the DSMMC system that needs to independently control an alternating current and a direct current. In the above-described method, capacitor voltages of unit converters are uneven when the inverter has stopped. Therefore, in the case of the DSMMC system, returning cannot be made from the commercial power to the high-voltage inverter.

The following describes a case illustrated in FIG. 18 where a frequency converter is applied to a synchronous machine having an excitation winding that uses a conventional technology. However, Patent Literature 5 described above and Patent Literature 6 described above do not mention the type of the generator/motor (an induction machine, a permanent magnet synchronous machine, or a synchronous machine having an excitation winding). Accordingly, the following assumes a case where a frequency converter is added to a power generation system using an existing synchronous machine to make the speed thereof variable, and assumes that synchronization checkers are already provided at both ends of a breaker, and excitation control using a known technology is applied.

A variable frequency power supply is provided with a breaker CB1, and a bypass circuit is provided with a breaker CB2. The breakers are opened and closed to bidirectionally switch between the bypass operation and the converter operation.

FIG. 19 illustrates an operation sequence during the switching.

In response to a switching command from the bypass operation to the converter operation, the breaker CB2 is closed at time t1 to establish an asynchronous state at time t2; the breaker CB1 is closed at time t3; and a GDB state is established at time t4 to start the converter operation. The period from time t1 to time t4 serves as a no-current period.

In response to a switching command from the converter operation to the bypass operation, the converter control is switched from normal operation control to a bypass preparation mode at time t5, and the speed is settled to a speed obtained by taking into account a deceleration during switching (equal to or higher than the synchronous speed) during a motor operation and settled to a speed obtained by taking into account an acceleration (equal to or lower than the synchronous speed) during a generator operation. When the rotational speed has reached a settled value, the breaker CB1 is closed at time t6. After the synchronization is detected at time t7 at which the speed reaches the synchronous speed without being restrained, the converter operation stops at time t8, and the bypass operation starts at time t9.

Patent Literature 5 and Patent Literature described above do not disclose a problem that inevitably occurs in the above-described operation sequence due to the switching between the bypass operation and the converter operation and a solution to the problem.

A first problem is that, if the no-current period of the generator/motor occurring during the switching period is long, the engine is accelerated in an unrestrained state during the generator operation, or is decelerated during the motor operation. As a result, an out-of-phase input is applied to the alternating current system or the frequency converter when the current flow resumes.

If, instead, the no-current period of the generator/motor is short, a sudden short-circuit occurs when the input is resumed immediately after a rapid change in voltage amplitude when a load is shut off. In either case, a problem occurs that system fluctuation due to an overcurrent or machine impact due to transient torque occurs. As suggested by Patent Literature 6, this problem can be regarded as "having only a minor influence" during the switching under a small load, but cannot be ignored as the load increases.

A second problem is the following. In the case of general hydroelectric power generation equipment for use in the wind power generation or supply demand adjustment, the operation is inevitably frequently switched between the bypass operation and the converter operation. A problem occurs that the breaker replacement cycle decreases if the breaker is applied to the bypass switch.

A third problem is a problem of excitation control switching that occurs when an existing hydroelectric power generation facility or pumped storage power generation facility is remodeled into the FPC system. More than 50% of existing generator/motor machines are synchronous machines having an excitation winding, and the existing machines control the voltage of an excitation device (with the AVR). The excitation device has voltage source characteristics from the viewpoint of the excitation winding. During the converter operation, the frequency converter has current source characteristics from the viewpoint of the armature winding, and the excitation device is consequently a current source from the viewpoint of the excitation winding, and preferably substantially has permanent magnet characteristics. Therefore, the excitation current control (ACR) is preferably applied to a minor loop of the excitation control. A method can also be used in which the excitation control is applied in order to avoid switching or during the bypass operation. In either case, the voltage control is preferably switched to unity power factor control during the converter operation. Also to solve the above-described first problem, some type of switching of control is needed.

It is an object of the present invention to solve the problems described above, and provide a variable speed generator/motor device that uses a synchronous machine having an excitation winding.

Solution to Problem

FIG. 20 illustrates a circuit configuration illustrating means for solving the problems.

First means reduces a commutation current by providing a current-limiting element ACL1 at an alternating current terminal of a variable speed frequency power supply and a current-limiting element ACL2 at an alternating current terminal of a direct current voltage source.

A two-level converter illustrated as 1002 in FIG. 11A, a three-level converter illustrated as 801 in FIG. 8, and a five-level converter illustrated as 901 in FIG. 9 are applicable as the direct current voltage source. Any of the converters requires 1001 in FIG. 10, 802 in FIG. 8, or 902 in FIG. 9 as a harmonic filter. Inductance included in the harmonic filter serves as the current-limiting element ACL2.

Of the MMC converters illustrated in FIGS. 17A, 17B, and 17C, the DIMMC converter and the ZCMMC converter do not include a current-limiting element corresponding to the current-limiting element ACL2. These two types of the MMC converters each essentially conduct a direct current portion IDC from the alternating current terminal, and therefore, cannot be applied to the bypass operation. In the case of the DSMMC converter, a built-in circulating current reducing reactor Xd serves as a current-limiting element equivalent to ACL2. Therefore, no additional device is required.

Because of the above, the two-level converter, the three-level converter, the five-level converter, or the DSMMC converter among the VSC converters is applicable as the direct current voltage source of the present invention.

If a two-level converter, a three-level converter, or a five-level converter is applied as the variable speed frequency power supply, a current-limiting reactor or a step-up transformer needs to be added as the current-limiting element ACL1 to the alternating current terminal side. The DIMMC converter and the ZCMMC converter cannot be applied for the same reason as in the case of the direct current voltage source. In the case of the DSMMC converter, the built-in circulating current reducing reactor Xd serves as a current-limiting element equivalent to ACL1. Therefore, no additional device is required.

As second means, a measurement current transformer is provided in a position closer to a three-phase terminal of the synchronous machine having an excitation winding than a branch point of a bypass circuit provided between the variable frequency power supply and the three-phase terminal of the synchronous machine, and a unit is provided for adjusting the current of the synchronous machine having an excitation winding to be constant during the commutation period. This configuration achieves stable adjustment of the commutation current.

As third means, the excitation current control with the ACR is provided in addition to the voltage control (AVR) as the excitation control of the synchronous machine having an excitation winding during the bypass operation, and the control is switched to the excitation current control (ACR) during the converter operation and the commutation period. Thus, the stable operation of the synchronous machine having an excitation winding is achieved.

FIGS. 21A and 21B each illustrate a commutation mode during the operation switching achieved by the above-described configuration.

In the switching from the bypass operation to the converter operation, the variable frequency power supply starts operating (GDB) to start the commutation period; a generator current IG during the switching is held at a current command IG0 to bring a commutation current IT closer to IG; the current of a load switch LS is reduced to approximately zero; and then the load switch LS is opened to start the converter operation. Thus, the breaker need not be used for opening and closing the bypass circuit.

In the switching from the converter operation to the bypass operation, the load switch LS is closed to secure a current conducting path of the commutation current IT; a converter current command IC* is changed to zero to reduce the current so as to stop the converter (GB); and the bypass operation starts. Thus, the current of the synchronous machine can be kept constant during the commutation period.

The desired object can be achieved by the device configuration and the operation sequence described above.

Advantageous Effects of Invention

According to the present invention, a frequency converter and a control switching device using a bypass switching switch and a VSC converter are added to a power generation device or a generator/motor device that uses a synchronous machine having an excitation winding installed on the assumption of a constant-frequency operation using an alternating current system, and maximization is achieved both in efficiency of the electrical equipment in the bypass operation in a high load region and in efficiency of the machine in a low load region. A commutation period is provided during the switching between both operation modes. As a result, the continuity of the current of the generator/motor is ensured to increase the availability thereof, and a load associated with the switching affecting the life of the equipment can be reduced to achieve a long life and high reliability.

DESCRIPTION OF EMBODIMENTS

The following describes an example of a variable speed generator/motor device according to the present invention in detail using the drawings. The present invention is not limited by this example.

First Embodiment

Figure 1:
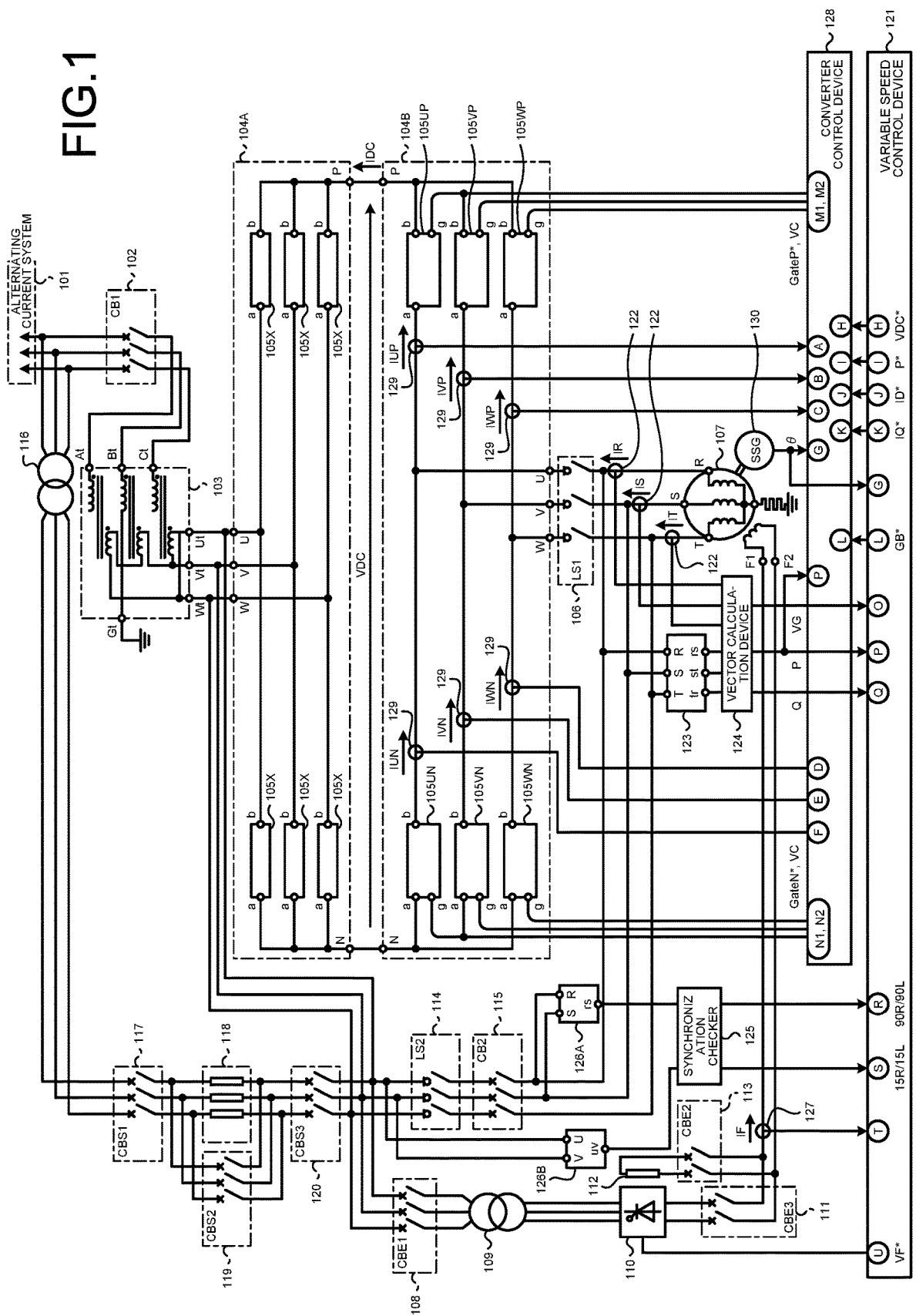
FIG. 1 is a circuit diagram illustrating a first embodiment, of the present invention.

FIG. 1 is a circuit diagram illustrating a first embodiment of the present invention.

An alternating current system 101 is connected to three-phase terminals (At, Bt, and Ct) of a main transformer 103 through a system breaker 102, and other three-phase terminals (Ut, Vt, and Wt) are connected to three-phase terminals (U, V, and W) of a direct current power supply device 104A. A first terminal (P) and a second terminal (N) of the direct current power supply device 104A are connected back-to-back to the first terminal (P) and the second terminal (N) of a direct current power supply device 104B.

The direct current power supply device 104B is provided with six arm converters (105UP, 105VP, 105WP, 105UN, 105VN, and 105WN) each including two terminals (a and b). The terminals b of three of the arm converters (105UP, 105VP, and 105WP) are connected in a star configuration to the first terminal (P) of the direct current power supply device 104B. The terminals a of the remaining three of the arm converters (105UN, 105VN, and 105WN) are connected in a star configuration to the second terminal (N) of the direct current power supply device 104B. The terminal a of the arm converter (105UP) is connected to the terminal b of the arm converter (105UN), and from a connection line therebetween, a line branches and is connected to a terminal R of a synchronous machine 107 having an excitation winding through a load switch (LS1) 106. The terminal a of the arm converter (105VP) is connected to the terminal b of the arm converter (105VN), and from a connection line therebetween, a line branches and is connected to a terminal S of the synchronous machine 107 having an excitation winding through the load switch (LS1) 106. The terminal a of the arm converter (105WP) is connected to the terminal b of the arm converter (105WN), and from a connection line therebetween, a line branches and is connected to a terminal T of the synchronous machine 107 having an excitation winding through the load switch (LS1) 106.

The direct current power supply device 104A connects six arm converters 105X each including the two terminals (a and b) in a Graetz configuration.

Connection lines between three-phase terminals (R, S, and T) of the synchronous machine 107 having an excitation winding and the load switch (LS1) are provided with branch points, and the branch points are connected to the three-phase terminals (Ut, Vt, and Wt) of the main transformer 103 through a bypass switch load switch (LS2) 114 and an overcurrent protection breaker (CB2) 115. A measurement current transformer 122 is provided between the branch points and the three-phase terminals (R, S, and T) of the synchronous machine 107 having an excitation winding. The overcurrent protection breaker (CB2) 115 is opened by an operation for protection from overcurrent of the synchronous machine 107 having an excitation winding detected by the measurement current transformer 122. The other switching is performed by the bypass switch load switch (LS2) 114.

The three-phase terminals (Ut, Vt, and Wt) of the main transformer 103 are connected to alternating current terminals of an excitation converter 110 through an excitation breaker 108 and an excitation transformer 109. Direct current terminals of the excitation converter 110 are connected to excitation winding terminals (F1 and F2) of a synchronous machine 107 having an excitation winding through an excitation breaker (CBE3) 111. The excitation winding terminals (F1 and F2) are connected to a current-limiting resistor 112 through an excitation breaker (CBE2) 113.

The alternating current system 101 is connected to the three-phase terminals (U, V, and W) of the direct current power supply device 104A through an initial charge transformer 116, an initial charge breaker (CBS1) 117, a current-limiting resistor 118, and an initial charge breaker (CBS3) 120. The current-limiting resistor 118 is connected in parallel to an initial charge breaker (CBS2) 119.

Reference numeral 121 denotes a variable speed control device. The measurement current transformer 122 and a measurement voltage transformer 123 for measuring line-to-line voltages among the three-phase terminals (R, S, and T) of the synchronous machine 107 having an excitation winding are connected to a vector calculation device 124. The vector calculation device 124 outputs a voltage VG, effective power P, and reactive power Q of the synchronous machine 107 having an excitation winding to the variable speed control device 121. The voltage and current of the synchronous machine 107 having an excitation winding have a variable frequency. Patent Literature 7 discloses a vector calculation method of the variable frequency.

Reference numeral 125 denotes a synchronization checker that receives voltages from a measurement voltage transformer 126B provided between terminals on the main transformer 103 side of the bypass switch load switch (LS2) 114 and from a measurement voltage transformer 126A provided between terminals of the bypass switch load switch 114 closer to the synchronous machine 107 having an excitation winding, and outputs voltage increase and decrease commands 90R and 90L and frequency increase and decrease commands 15R and 15L to the variable speed control device 121. Reference numeral 127 denotes a measurement current transformer that outputs an excitation current of the synchronous machine 107 having an excitation winding to the variable speed control device 121.

Reference numeral 128 denotes a converter control device that receives three-phase alternating currents (IUN, IVN, IWN, IUP, IVP, and IWP) measured by a direct current transformer 129 for measuring output currents of the six arm converters, receives the rotational phase 9 expressed in electrical angle from the phase detector 130, and receives the effective power measurement signal P from the vector calculation device 124, and performs control calculation, and outputs gate signals (GateP*) to the three arm converters (105UP, 105VP, and 105WP) and outputs gate signals (GateN*) to the remaining three arm converters (105UN, 105VN, and 105WN).

Figure 2A:
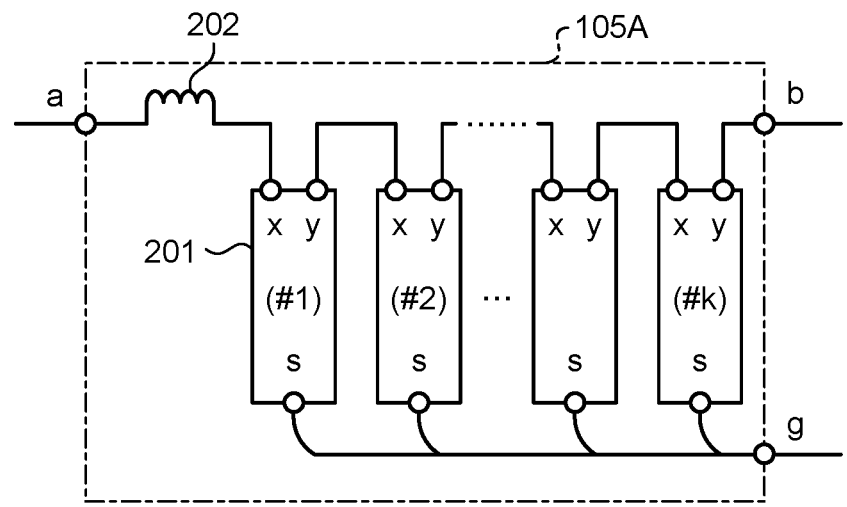
FIG. 2A is a circuit diagram of an am converter illustrating embodiments of the present invention.
Figure 2B:
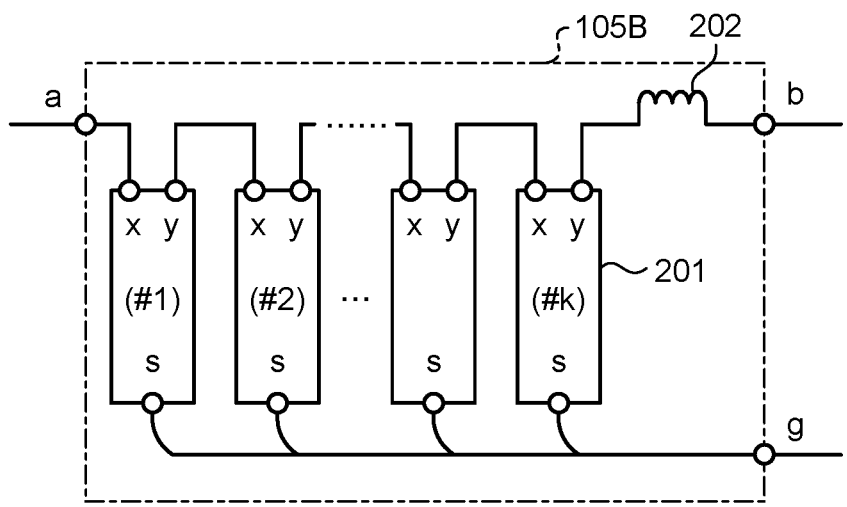
FIG. 2B is a circuit diagram of another arm converter illustrating the embodiments of the present invention.

FIGS. 2A and 2B are circuit diagrams of the arm converters 105X, 105UP, 105VP, 105WP, 105UN, 105VN, and 105WN illustrating the first embodiment of the present invention, k (k is a natural number) unit converters 201 each including two terminals (x and y) are connected in series, and are further connected in series to a current-limiting reactor 202. The current-limiting reactor may be provided to the terminal a of the arm converter as illustrated in 105A, or may be provided to the terminal b of the arm converter as illustrated in 105B, or any combination of either of these configurations may be employed.

Figure 3:
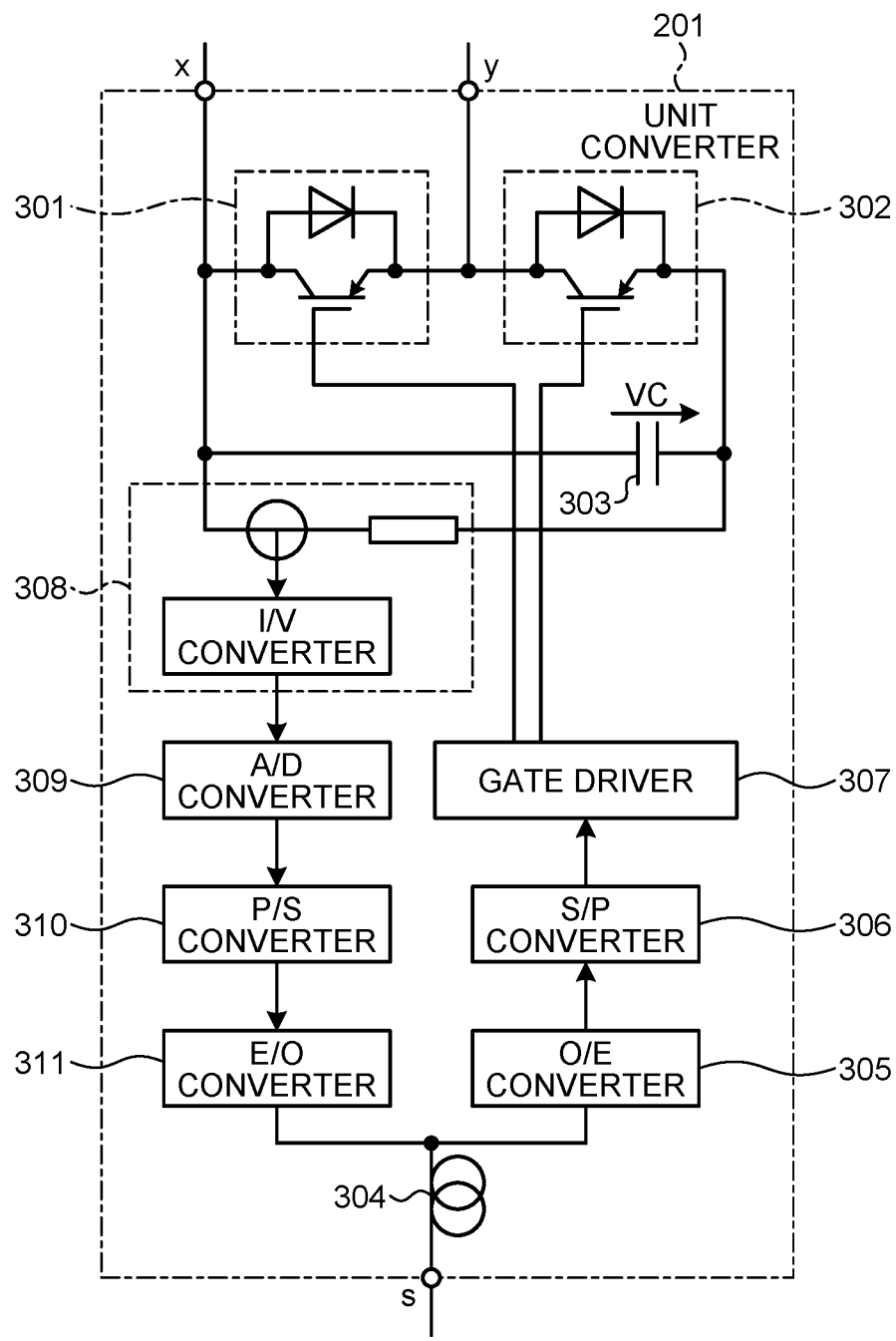
FIG. 3 is a circuit diagram of a unit converter illustrating the embodiments of the present invention.

FIG. 3 is a circuit diagram of each of the unit converters 201 illustrating the first embodiment of the present invention. The unit converter 201 connects a switching element 301 and a switching element 302 constituting a bidirectional chopper circuit as an energy storage element having voltage source characteristics to a capacitor 303, and performs PWM control based on gate signals to the switching elements 301 and 302 that are supplied from an optical communication cable 304 connected to the converter control device 128 through an optical-to-electrical conversion element 305 and a serial-to-parallel conversion circuit 306 to a gate driver 307, and adjusts an average voltage between the two terminals (x and y) between zero and a capacitor voltage VC. The capacitor voltage VC returns an analog signal output of a direct current transformer 308 through an analog-to-digital converter 309, a parallel-to-serial converter 310, an electrical-to-optical conversion element 311, and the optical communication cable 304 to the converter control device 128.

With this configuration, the current flows in only either one of the switching elements 301 and 302, so that the loss can be minimized.

In the embodiment illustrated in FIGS. 1, 2A, 2B, and 3, a sequence at the start of operation will be described.

Before the start of the operation, the system breaker 102 is opened, the capacitor 303 of the direct current power supply device 104A is discharged, and the synchronous machine 107 having an excitation winding is in the stopped state.

First, the initial charge breaker (CBS3) 120 is closed. Subsequently, the initial charge breaker (CBS1) 117 is closed. The current is restrained by a resistance value of the current-limiting resistor 118, and the capacitor 303 of the direct current power supply device 104A starts to be charged through a diode included in the switching element 302. When the current of the initial charge breaker (CBS1) 117 that decreases with increase in the capacitor voltage VC has reached a desired value, the initial charge breaker (CBS2) 119 is closed to accelerate the charging. This operation increases the voltage VC of the capacitor 303 to a value equivalent to approximately 1/2 k times a direct current voltage command VDC*. The symbol k denotes the number of series k of the unit converters 201. Subsequently, the gate commands GateP* and GateN* of the arm converters 105 are issued to start the operation, and the voltage of the capacitor 303 is increased to a desired value in a chopping mode of the switching elements 301 and 302. After the voltage is increased, the initial charge breaker (CBS3) 120 is opened to end the initial charge operation.

However, during the normal stop, the capacitor 303 of the direct current power supply device 104A is not discharged. Accordingly, when the capacitor 303 is exceptionally self-discharged immediately after being stopped for a long time, the above-described initial charge operation need not be performed except in the case of immediately after the discharge during maintenance.

Subsequently, the system breaker (CB1) 102 is closed to charge the main transformer, and the operation is placed in a standby state.

The following describes a method of starting a motor mode of the variable speed generator/motor device according to Patent Literature 4.

The bypass switch load switch (LS2) 114 is kept in an open state, and the overcurrent protection breaker (CB2) 115 is kept in the closed state.

The excitation winding breaker (CBE2) 113 is placed in the closed state, and the excitation winding breaker (CBE3) 111 is placed in the open state. When the direct current power supply device 104B is started by the above-described operation, the synchronous machine 107 having an excitation winding starts in an induction machine mode established by damper windings. After the start, the synchronous machine 107 having an excitation winding is once stopped by a gate block command GB* to the direct current power supply device 104B, and the excitation winding breaker (CBE3) 111 is closed to connect the synchronous machine 107 having an excitation winding to the excitation converter 110. Subsequently, the excitation winding breaker (CBE2) 113 is opened to disconnect the current-limiting resistor 112. The direct current power supply device 104B is restarted, and the synchronous machine 107 having an excitation winding is controlled to accelerate as a synchronous machine. After the rotational speed enters a variable speed operation range, the operation is switched from the acceleration control to an operation in the normal variable speed motor mode.

A method of starting a generator mode of the variable speed generator/motor device may be the same as the method of starting the motor mode. However, unless a particular reason is given, a method is generally used in which the engine accelerates the generator to the variable speed operation range or to the synchronous speed.

Figure 4:
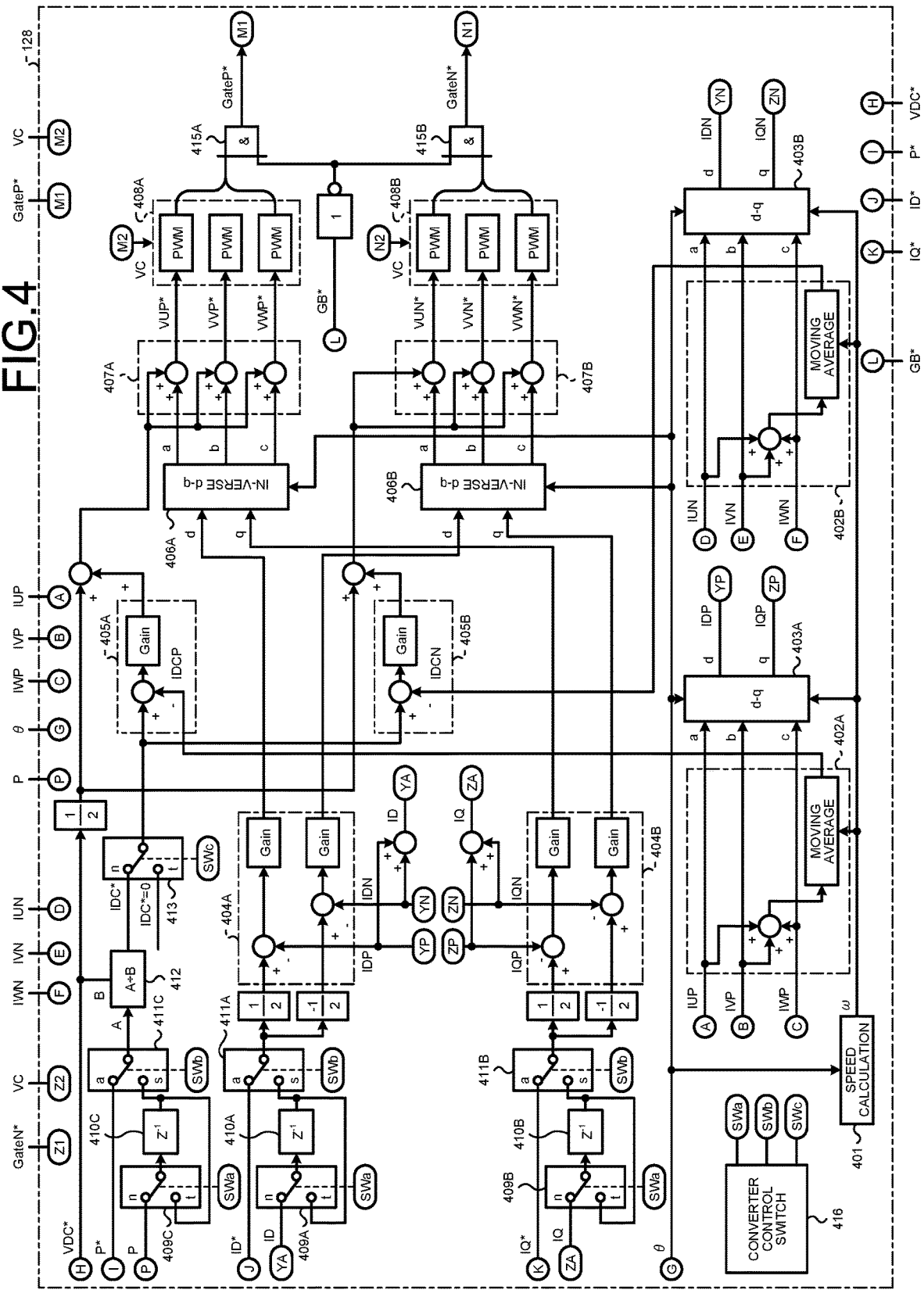
FIG. 4 is a block diagram of a converter control device illustrating the first embodiment of the present invention.

FIG. 4 is a block diagram of the converter control device 128 illustrating the first embodiment.

Reference numeral 401 denotes a speed calculator that calculates a rotational speed $\omega$ based on a number of samples Np obtained from a current value of a rotational phase signal $\theta$ received from a rotational phase detector 130 and a signal at the same phase in the previous cycle. When $\Delta t$ denotes a sampling period, a relation $\omega = 2 \times \pi / Np \times \Delta t$) holds.

Reference numeral 402A denotes a moving average calculator that obtains a moving average of the total of the three-phase alternating currents (IUP, IVP, and IWP) Np times to calculate a direct current IDCP. Reference numeral 402B denotes a moving average calculator that obtains the moving average of the total of the three-phase alternating currents (IUN, IVN, and IWN) Np times to calculate a direct current ZDCK.

Reference numeral 403A denotes a d-q converter that performs calculation of Expression 1. Reference numeral 403B denotes a d-q converter that performs calculation of Expression 2. In Expressions 1 and 2, the phase order is U-V-W.

[Expression 1]

$$\begin{bmatrix} IQP \\ IDP \end{bmatrix} = \sqrt{\frac{2}{3}} \begin{bmatrix} \cos\theta & \cos(\theta - 2\pi/3) & \cos(\theta + 2\pi/3) \\ \sin\theta & \sin(\theta - 2\pi/3) & \sin(\theta + 2\pi/3) \end{bmatrix} \begin{bmatrix} IUP \\ IVP \\ IWP \end{bmatrix} \quad (1)$$

[Expression 2]

$$\begin{bmatrix} IQN \\ IDN \end{bmatrix} = \sqrt{\frac{2}{3}} \begin{bmatrix} \cos\theta & \cos(\theta - 2\pi/3) & \cos(\theta + 2\pi/3) \\ \sin\theta & \sin(\theta - 2\pi/3) & \sin(\theta + 2\pi/3) \end{bmatrix} \begin{bmatrix} IUN \\ IVN \\ IWN \end{bmatrix} \quad (2)$$

Reference numerals 404A and 404B denote alternating current adjusters, each of which performs control calculation such that command values obtained by halving the command values ID* and IQ* match with measurement calculation values IDP and IQP, command values obtained by halving the command values ID* and IQ* and reversing the polarities thereof match with the measurement calculation values IDN and IQN.

Reference numeral 405A denotes a direct current adjuster that performs control calculation such that a direct current command IDC* obtained by dividing an output command P* by the output voltage VDC* of a direct current power supply matches with a measurement calculation value IDCP. Reference numeral 405B denotes a direct current adjuster that performs control calculation such that the direct current command IDC* matches with a measurement calculation value IDCN.

Reference numerals 406A and 406B denote inverse d-q conversion calculators, each of which calculates Expression 3.

[Expression 3]

$$\begin{bmatrix} a \\ b \\ c \end{bmatrix} = \sqrt{\frac{2}{3}} \begin{bmatrix} \cos\theta & \sin\theta \\ \cos(\theta - 2\pi/3) & \sin(\theta - 2\pi/3) \\ \cos(\theta + 2\pi/3) & \sin(\theta + 2\pi/3) \end{bmatrix} \begin{bmatrix} d \\ q \end{bmatrix} \quad (3)$$

Reference numeral 407A denotes a direct current voltage command correction calculator for the arms 105UP, 105VP, and 105WF, and reference numeral 407B denotes a direct current voltage command correction calculator for the arms 105UN, 105VN, and 105WN. The direct current voltage command correction calculators 407A and 407B output output voltage commands VUP*, VVP*, VWP*, VUN*, VVN*, and VWN* to the respective arms.

According to the above, when phase voltages of the three-phase terminals (R, S, and T) of the synchronous machine 107 having an excitation winding are denoted as (VR*, VS*, and VT*), the output voltage commands to the arm converter 105UP and the arm converter 105UN are expressed as:

VRP*=+VR*+(1/2)×VDC

VRN*=−VR*+(1/2)×VDC

Based on these output voltage commands and the capacitor voltage VC of the unit converter 201, PWM calculators 408A and 408B output the gate commands GateP* and GateN*.

Reference numeral 409A denotes a command switch that selectively outputs a current calculation value ID when a binary selection command value SWa is in a state n, or an output of a previous value output unit 410A when the command value is in a state t. Through this operation, the command switch 409A holds the current calculation value ID when the command value SWa is switched from the state n to the state t, and outputs the held value when the command value SWa is in the state t. A command switch 411A selectively outputs the current command ID* when a binary selection command value SWb is in a state a, or the output of the previous value output unit 410A when the command value is in a state s.

Reference numeral 409B denotes a command switch that selectively outputs a current calculation value IQ when the binary selection command value SWa is in the state n, or an output of a previous value output unit 410B when the command value is in the state t. Through this operation, the command switch 409B holds the current calculation value IQ when the command value SWa is switched from the state n to the state t, and outputs the held value when the command value SWa is in the state t. A command switch 411B selectively outputs the current command IQ* when the binary selection command value SWb is in the state a, or the output of the previous value output unit 410B when the command value is in the state s.

Reference numeral 409C denotes a command switch that selectively outputs the effective power value P when the binary selection command value SWa is in the state n, or an output of a previous value output unit 410C when the command value SWa is in the state t. Through this operation, the command switch 409C holds the effective power value P when the command value SWa is switched from the state n to the state t, and outputs the held value when the command value is in the state t, A command switch 411C selectively outputs the effective power command P* when the binary selection command value SWb is in the state a, or the output of the previous value output unit 410C when the command value is in the state s.

A divider 412 outputs the direct current command IDC* based on the direct current voltage command VDC* and the output of the command switch 411C. Reference numeral 413 denotes a command switch that outputs IDC* when a command value SWc is in the state n, or outputs zero when the command value SWc is in the state t.

When a gate block signal GB* is set to one, the gate commands GateP* and GateN* are forced to stop by a NOT circuit 414 and gate output blocking circuits 415A and 415B. As a result, all the switching elements 301 and 302 of the direct current power supply devices are prevented from generating arcs.

Reference numeral 416 denotes a converter control switch that selectively produces a binary output of the command value SWa, the command value SWb, or the command value SWc according to a desired operation mode.

Figure 5:
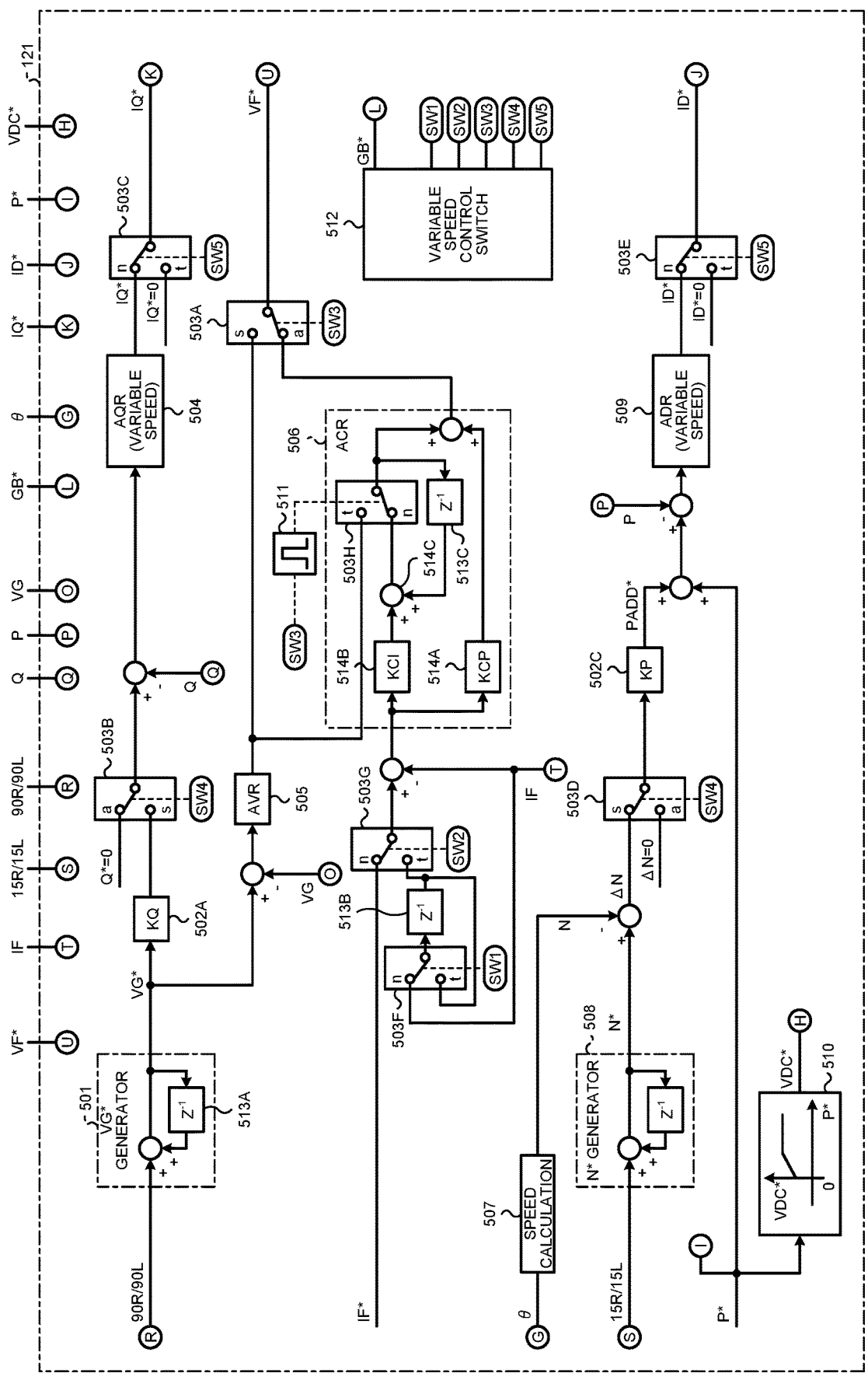
FIG. 5 is a block diagram of a variable speed control device illustrating the embodiments of the present invention.

FIG. 5 is a control block diagram of the variable speed control device 121 illustrating the first embodiment of the present invention.

Reference numeral 501 denotes a voltage command generator that receives the voltage increase command 90R and the voltage decrease command 90L from the synchronization checker 125, and outputs a result obtained by integrating the received command values into a value output by a previous value output unit 513A as a voltage command VG*. The voltage command VG* is converted into the reactive power command Q* by a constant gain (KQ) 502A. A reactive power adjuster 504 receives a comparison result between the reactive power command Q* and the reactive power Q received from the vector calculation device 124, and outputs the current command IQ* to the command switch 503C.

A generator voltage adjuster 505 receives a comparison result between the voltage command VG* and the generator voltage VG received from the vector calculation device 124, and outputs a signal to the command switch 503A.

An excitation current adjuster 506 receives a comparison result between an excitation current command IF* and an excitation current IF from the measurement current transformer 127, and outputs a signal to the command switch 503A.

The excitation current adjuster 506 uses a constant gain 514A equivalent to a proportional gain (KCP), a constant gain 514B equivalent to an integral gain (KCI), a previous value output unit 513C, and an adder 514C to cumulatively add the output of the constant gain 5143, and outputs the result as a proportional-integral control calculation result.

The command switch 503A selects the output of the generator voltage adjuster 505 when a command value SW3 is in the state s, or selects the output of the excitation current adjuster 506 when the command value SW3 is in the state a, and outputs the result, as an excitation voltage command VF* to the excitation converter 110.

Reference numeral 507 denotes a speed calculator that calculates a rotational speed N from an output 6 of a rotational phase detector 130.

Reference numeral 508 denotes a speed command generator that receives the frequency increase command 15R and the frequency decrease command 15L from the synchronization checker 125, and outputs a result obtained by integrating the received command values using a previous value output unit 513D as a speed command N*.

A difference ΔN between the speed command N* and the rotational speed N is converted into an effective power correction command PADD* by a constant gain (KP) 502C.

The effective power correction command PADD* is added to the effective power command P*; the result is compared with the effective power P received from the vector calculation device 124; and the result, is supplied to and adjusted by an effective power adjuster 509 to be the current command ID*, which is output to the converter control device 128.

Reference numeral 510 denotes a direct current voltage command generator that calculates the direct current voltage command VDC* from the effective power command P*, and outputs the result to the converter control device 128.

Reference numeral 503B denotes a command switch that outputs the output of the constant gain (KQ) 502A when a command value SW4 is in the state s, or outputs zero when the command value SW4 is in the state a.

Reference numeral 503C denotes a command switch that outputs the excitation current command IQ* when a command value SW5 is in the state n, or outputs zero when the command value SW5 is in the state t.

Reference numeral 503D denotes a command switch that outputs ΔN mentioned above when the command value SW4 is in the state s, or outputs zero when the command value SW4 is in the state a.

Reference numeral 503E denotes a command switch that outputs the current command ID* when the command value SW5 is in the state n, or outputs zero when the command value SW5 is in the state t.

Reference numeral 503F denotes a command switch that selectively outputs an output, of a previous value output unit 513B when a command value SW1 is in the state t, or the excitation current IF from the measurement current transformer 127 when the command value SW1 is in the state n, and supplies the selective output to the previous value output unit 513B.

Reference numeral 503G denotes a command switch that selectively outputs the excitation current command IF* when a command value SW2 is in the state n, or the output of the previous value output unit 513B when the command value SW2 is in the state t.

A rise detector 511 sets a command to a command switch 503H to the state t only during an operation of detecting a change in the command value SW3 from the state s to the state a, and returns the command to the state n during the next operation. The rise detector 511 holds the command to the command switch 503H in the state n during the operation of detecting a change in the command value SW3 from the state a to the state s, and also holds the command to the command switch 503H in the state n when the command value SW3 does not change.

Reference numeral 503H denotes the command switch that switches to an adder output equivalent to an integral calculation result when the command value from the rise detector 511 is in the state n, or resets the integral calculation result and switches to the output from the generator voltage adjuster 505 when the command value from the rise detector 511 is in the state t.

Reference numeral 512 denotes a variable speed control switch that selectively produces a binary output of each of the command value SW1, the command value SW2, the command value SW3, the command value SW4, and the command value SW5, according to the desired operation mode. The variable speed control switch 512 also outputs the gate block signal GB* to the converter control device 128.

Figure 6:
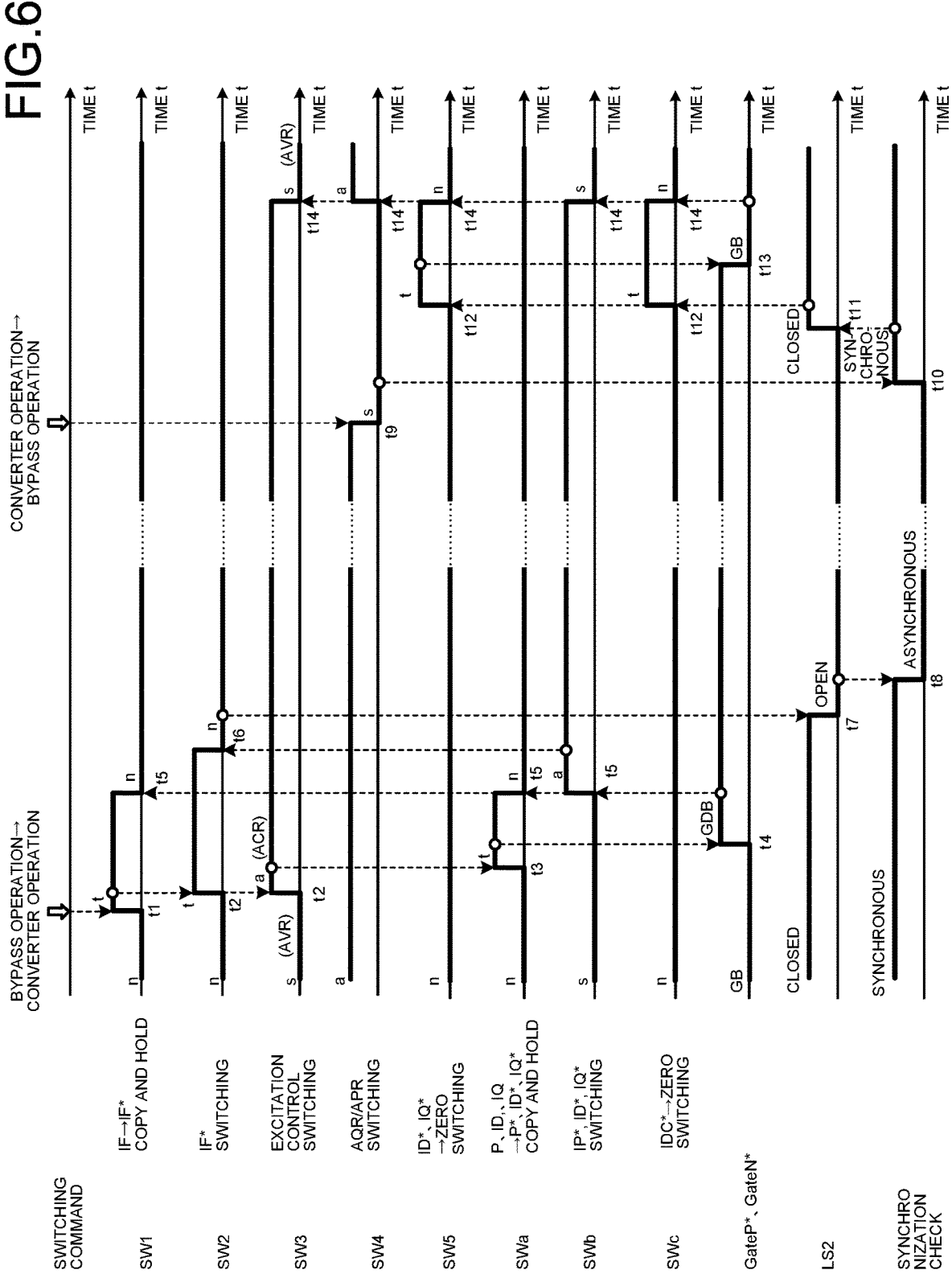
FIG. 6 is an operation sequence illustrating the first embodiment of the present invention.

FIG. 6 is an operation sequence illustrating the first embodiment of the present invention.

The following describes a method of switching from the bypass operation to the converter operation.

First, the states during the bypass operation will be described from the top row of FIG. 6 downward.

The command value SW1 is in the state n. The previous value output unit 513B continues updating the excitation current IF. Thus, the operation is prepared for being switched to the converter operation. The command value SW2 is in the state n. The command switch 503G continues updating the excitation current command IF*. Thus, the operation is prepared for being switched to the converter operation. SW3 is in the states. The command switch 503A selects the output from the generator voltage adjuster 505, and outputs the result as the excitation voltage command VF*, which is controlled in voltage by the generator voltage adjuster 505. SW4 is in the state a. The command switch 503B selectively outputs the reactive power command Q*=0 (command that power factor=1). The command switch 503D selectively outputs the speed deviation ΔN=0.

According to the present embodiment, the state immediately before the switching from the bypass operation to the converter operation is held as an initial state, so that an effect of achieving the stable operation switching is provided. The state of the variable speed control device 121 is as described above.

The command value SWa is in the state n. The previous value output unit 410A continues updating the converter current ID. The previous value output unit 410B continues updating the converter current IQ. The previous value output unit 410C continues updating the effective power P. Thus, the operation is prepared for being switched to the converter operation. The command value SWb is in the state s. The command switch 411A continues updating the converter current ID. The command switch 411B continues updating the converter current IQ. The command switch 411C continues updating the effective power P. Thus, the operation is prepared for being switched to the converter operation. The command value SWc is in the state n. The command switch 413 continues updating the direct current command IDC* calculated from the effective power P and the direct current voltage command VDC*. The state of the converter control device 128 is as described above.

The level of the gate block command GB* is one, so that the gate commands GateP* and GateN* to the direct current power supply device 104B are in a gate stop state (hereinafter, called "GB state"). Since the capacitor 303 has been increased in voltage by the chopping operation during the initial charge, the direct current power supply device 104B does not conduct current through the diode of the switching element 302.

The bypass switch load switch (LS2) 114 is in the closed state. The synchronization checker 125 produces no output (90R/90L and 15R/15L). The bypass operation state is as described above.

When the variable speed control device 121 receives a switching command to the converter operation at time t1, the command value SW1 changes to the state t, and the previous value holder 513B holds the excitation current IF at the time of the change in the state of SW1.

At time t2 after the sampling period Δt has elapsed from time t1, SW2 changes to the state s, and the command switch 503G holds the value of the excitation current IF at time t1. SW3 changes to the state a, and the excitation voltage command VF* is switched to the output of the excitation current adjuster 506. At the time when SW3 changes to the state a, a one-shot operation of the command switch 503H replaces the integrator output of the excitation current adjuster 506 with a value of the excitation voltage command VF* immediately before the change.

According to the present embodiment, the continuity of the excitation voltage command VF* is ensured, so that the effect of achieving the stable operation switching is provided.

Although time t3 may be the same time as time t2, a transmission delay from the variable speed control device 121 to the converter control device 128 often occurs. If the transmission delay can be set shorter than a transient phenomenon, time t3 can be assumed to be the same as time t2. After the command value SWa changes to the state t at time t3, the previous value output unit 410A holds the current ID at the time of the change in the state of the command value SWa; the previous value output unit 410B holds the current IQ at the time of the change in the state of the command value SWa; and the previous value output unit 410C holds the effective power P at the time of change in the state of the command value SWa.

At time t4 after the sampling period Δt has elapsed from time t3, the level of the gate block command GB* is changed to zero; the gate commands GateP* and GateN* are placed in a gate output state (hereinafter, called "GDB state"); and the direct current power supply device 104B starts operating.

At time t4, the bypass operation period ends, and the commutation period from the bypass operation to the converter operation starts.

Time t5 is determined by a delay setting value from time t4. The value is set by assuming a margin for a rising response time of the converter control system. A period of several cycles based on the frequency of the alternating current system 101 serves as a target for the setting value. After the command value SWb changes to the state a at time t5, the command switch 411A is switched to the current command ID* from the variable speed control device 121; the command switch 411B is switched to the current command IQ*; and the command switch 411C is switched to the effective power command P*. Thus, the converter control device 128 completes the switching to the converter operation mode. At time t5, SW1 is switched to the state n, and SWa is switched to the state n. Thus, the operation is prepared for being switched to the bypass operation.

After the command value SW2 changes from the state t to the state n at time t6, the command switch 503G is switched to the excitation current command IF*.

Time t6 is determined by the delay setting value from time t5. The value is set by assuming a margin for the switching response time of the converter control system. However, since a response time to the current commands ID* and IQ* is shorter than a response to the command IF*, waiting for the response time is not necessarily required. The order of the next time t7 and time t6 may be reversed without trouble.

Time t7 is set using the commutation period from the bypass switch load switch LS2 to the direct current power supply device 104B as a guide. Since the commutation period can be adjusted to be much shorter than an output change period of the synchronous machine 107 having an excitation winding, the current of the bypass switch load switch LS2 can be quickly reduced to zero. When the bypass switch load switch LS2 is closed at time t7, the commutation period ends, and the converter operation period starts.

At time t8, the voltage supplied to the synchronization checker 125 is placed in the asynchronous state. However, at this time, excluding the synchronous checking function does not cause the outputs (90R/90L and 15R/15L) to affect the variable speed control device 121 and the converter control device 128.

The following describes a method of switching from the converter operation to the bypass operation.

When the variable speed control device 121 receives a switching command to the bypass operation at time t9, the command value SW4 changes to the state s; the command switch 503B is switched to the output of the constant gain 502A, which is KQ times the voltage command VG*. This operation starts generator voltage adjustment by the voltage increase command 90R and the voltage decrease command 90L from the synchronization checker 125. The command switch 503D is switched to a value changing with time according to the deviation ΔN between the rotational speed command N* and the rotational speed N, thus starting the generator voltage adjustment by the frequency increase command 15R and the frequency decrease command 15L from the synchronization checker 125.

At time t10, the synchronization checker 125 detects the synchronization. Time t10 is determined by a time from the start of the synchronization adjustment at time t9 to the detection of the synchronization by the synchronization checker 125, and, although being affected by an engine torque variation during power generation and a load torque variation during motor operation in an exact, sense, is determined by a response time of the variable speed control system.

At time t11 the bypass switch load switch LS2 is closed. Time t11 is determined by a time elapsed from when a switch-on command is output after one sampling period Δt from time t10 to when the switch is actually closed.

At time t11, the converter operation period ends, and the commutation period from the converter operation to the bypass operation starts.

At time t12, the command SWc is switched to the state t, and the command switch 413 switches the direct current command IDC* to zero. The command SW5 is switched to the state t. The command switch 503C switches the current command IQ* to zero. The command switch 503E switches the current command ID* to zero. The current of the direct current power supply device 104B is reduced to zero.

According to the present embodiment, the current commend is reduced to zero before the GB state is established, so that an effect of achieving the stable operation switching is provided.

At time t13, the level of the gate block command GB* is changed to one; the gate commands GateP* and GateN* are placed in the GB state; and the direct current power supply device 104B stops.

Time t13 is determined by a delay setting value from time t12. The value is set by assuming a margin for the rising response time of the converter control system. The period of several cycles based on the frequency of the alternating current system 101 serves as a target for the setting value.

When the direct current power supply device 104B stops at time t13, the commutation period ends, and the bypass operation period starts.

At time t14, the command SW3 is switched to the state s, and the excitation voltage command VF* is switched from the excitation current adjuster 506 to the generator voltage adjuster 505. Thus, the state is switched to the normal synchronous machine control state. At time t14, SW4 is switched to the state a; SW5 and SWc are switched to the state n; and SWb is switched to the state s. Thus, the operation is prepared for being switched to the converter operation. According to the above, the state before time t1 is restored.

Time t14 is determined by a delay setting value from time t13. Although the setting value is affected by the engine torque variation during the power generation and the load torque variation during the motor operation in an exact sense, the setting value may be determined by a response time of the generator voltage adjuster 505.

Figure 7:
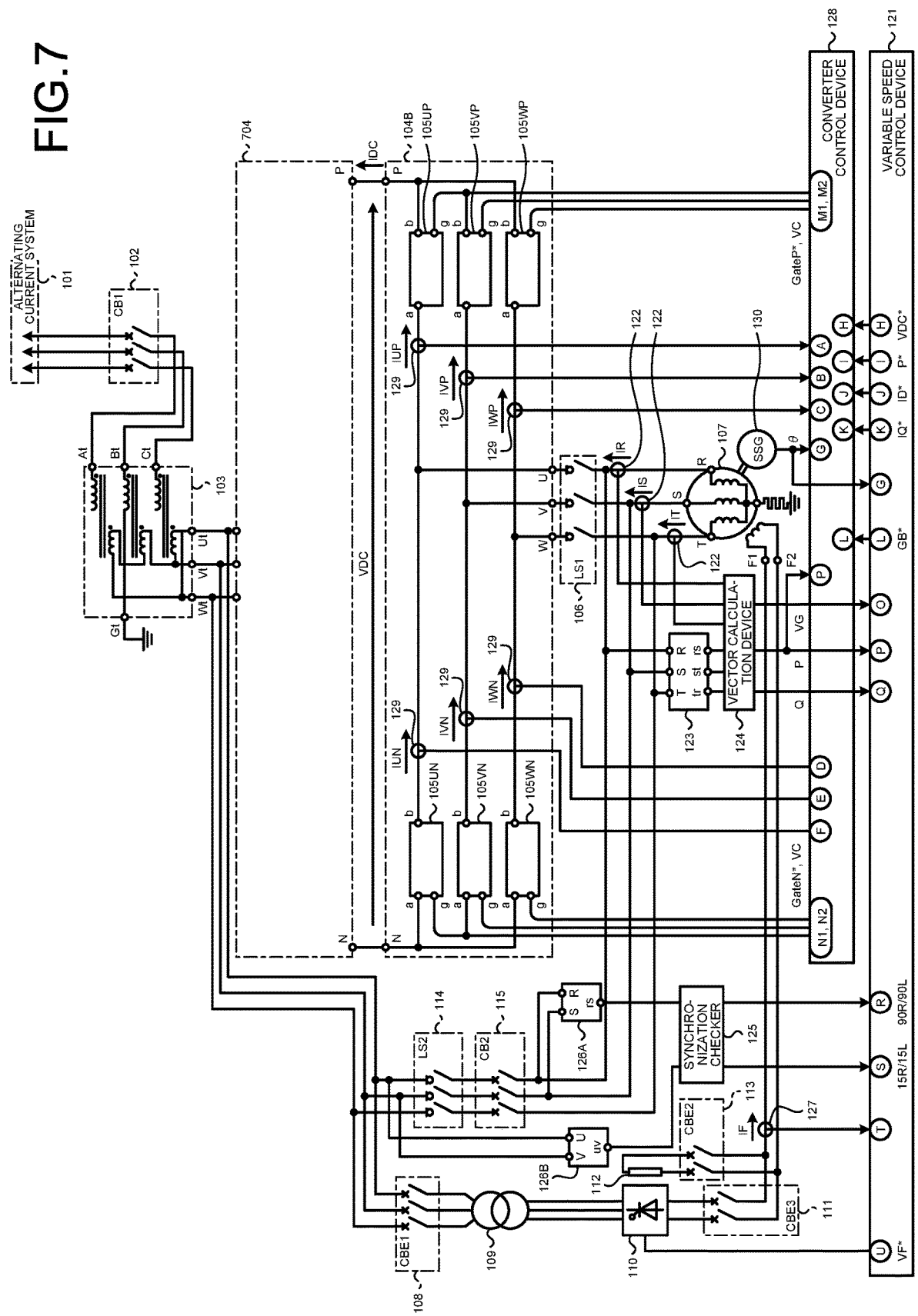
FIG. 7 is a circuit diagram illustrating a first other embodiment of the present invention.

FIG. 7 is a circuit diagram illustrating a first other embodiment of the present invention. The same reference numerals as those in FIG. 1 represent the same content, and therefore, will not be described to avoid repetition.

The three-phase terminals (U, V, and W) of a direct current power supply device 704 are connected to the three-phase terminals (Ut, Vt, and Wt) of the main transformer 103. The first terminal (P) and the second terminal (N) of the direct current power supply device 704 are connected back-to-back to the first terminal (P) and the second terminal (N) of the direct current power supply device 1043.

Figure 8:
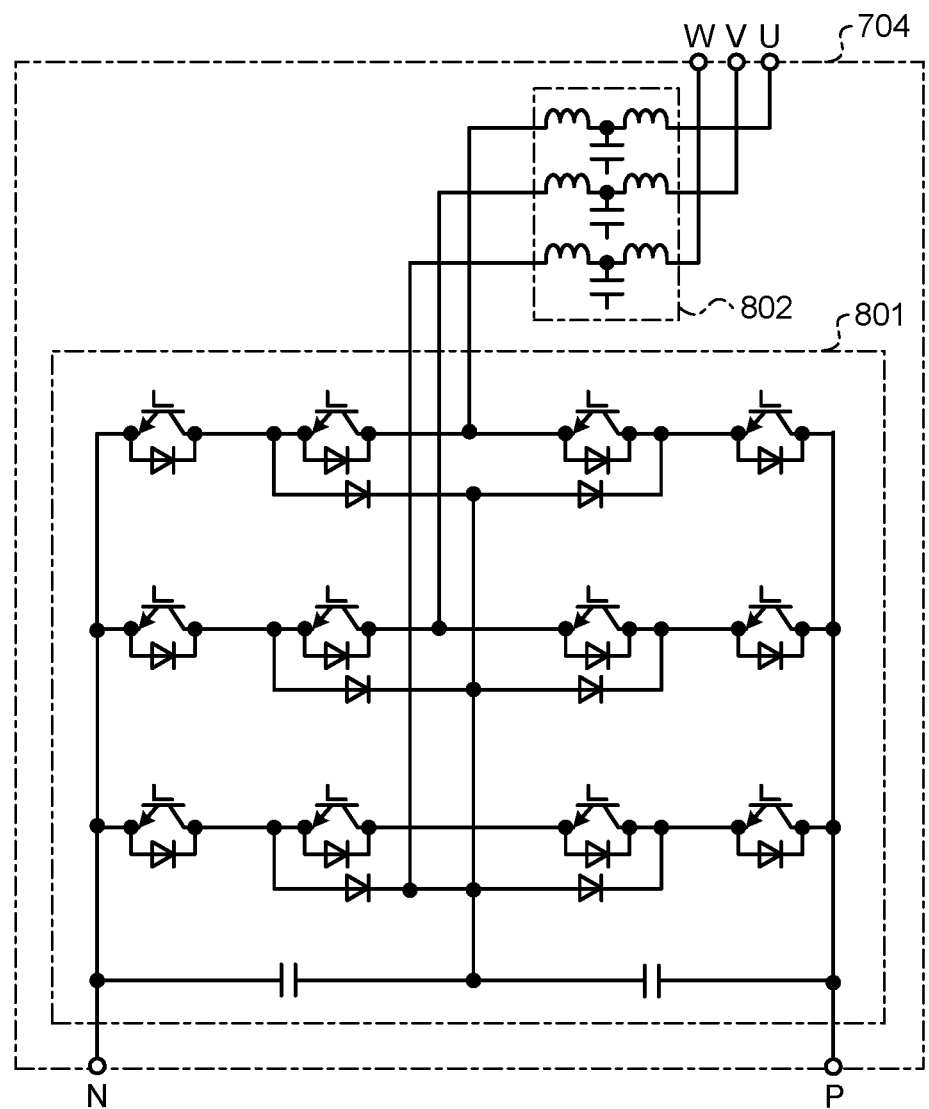
FIG. 8 is a circuit diagram of a VSC converter illustrating the first other embodiment of the present invention.

FIG. 8 is a circuit diagram of the direct current power supply device 704 illustrating the first other embodiment of the present invention.

Reference numeral 801 denotes a three-level VSC conversion circuit. Reference numeral 802 denotes a harmonic filter. The harmonic filter 802 provides a current reduction effect during the commutation period of both the converter operation and the bypass operation.

Figure 9:
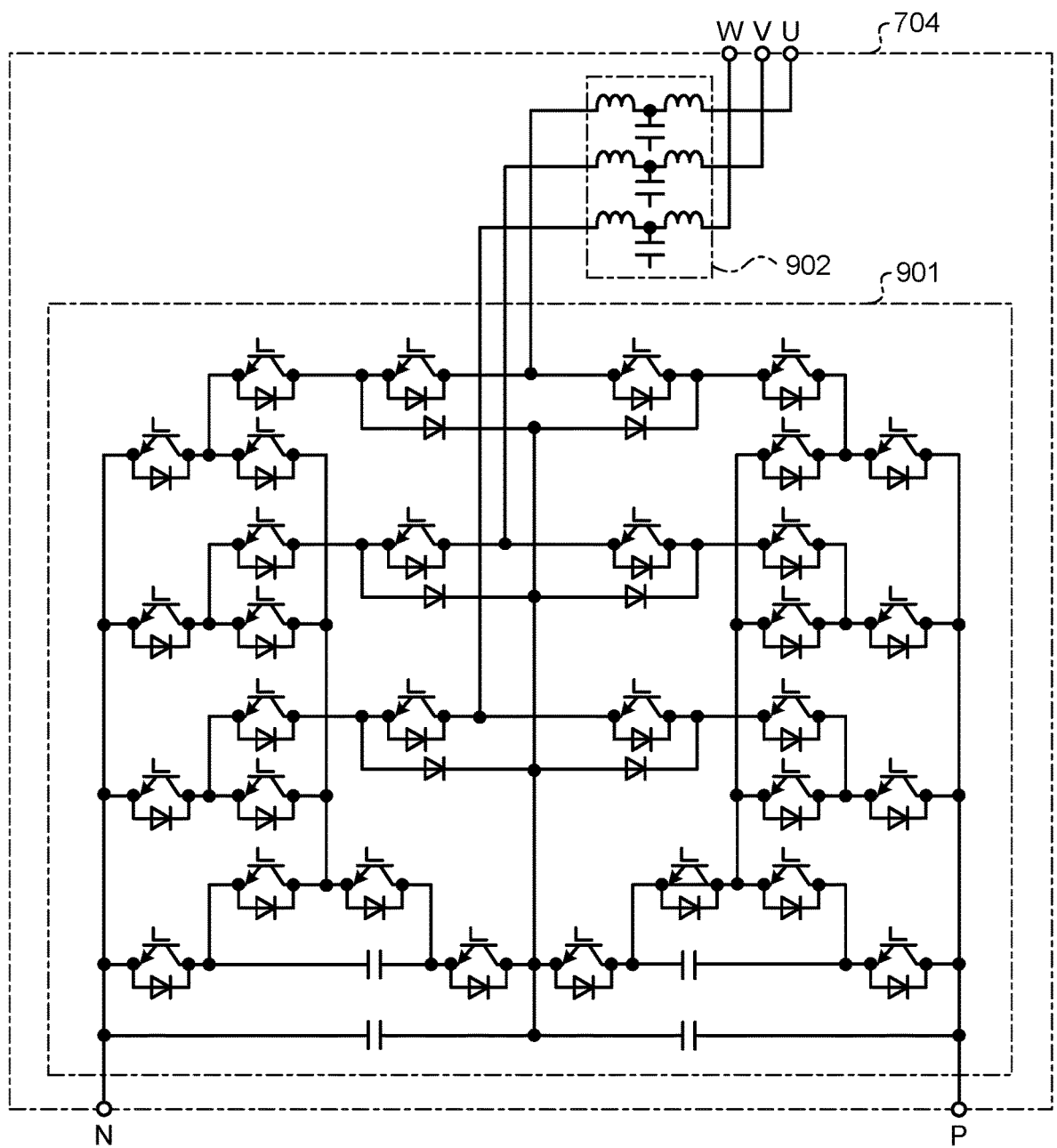
FIG. 9 is a circuit diagram of another VSC converter illustrating the first other embodiment of the present invention.

FIG. 9 is another circuit diagram of the direct current power supply device 704 illustrating the first other embodiment of the present invention.

Reference numeral 901 denotes a five-level VSC conversion circuit disclosed in Non Patent Literature 1. Reference numeral 902 denotes a harmonic filter. The harmonic filter 902 provides the current reduction effect during the commutation period of both the converter operation and the bypass operation.

According to the embodiment of FIGS. 8 and 9, devices for initial charge including, for example, the initial charge transformer 116, the initial charge breakers 117, 119, and 120, and the current-limiting resistor 118 can be eliminated.

Second Embodiment

Figure 10:
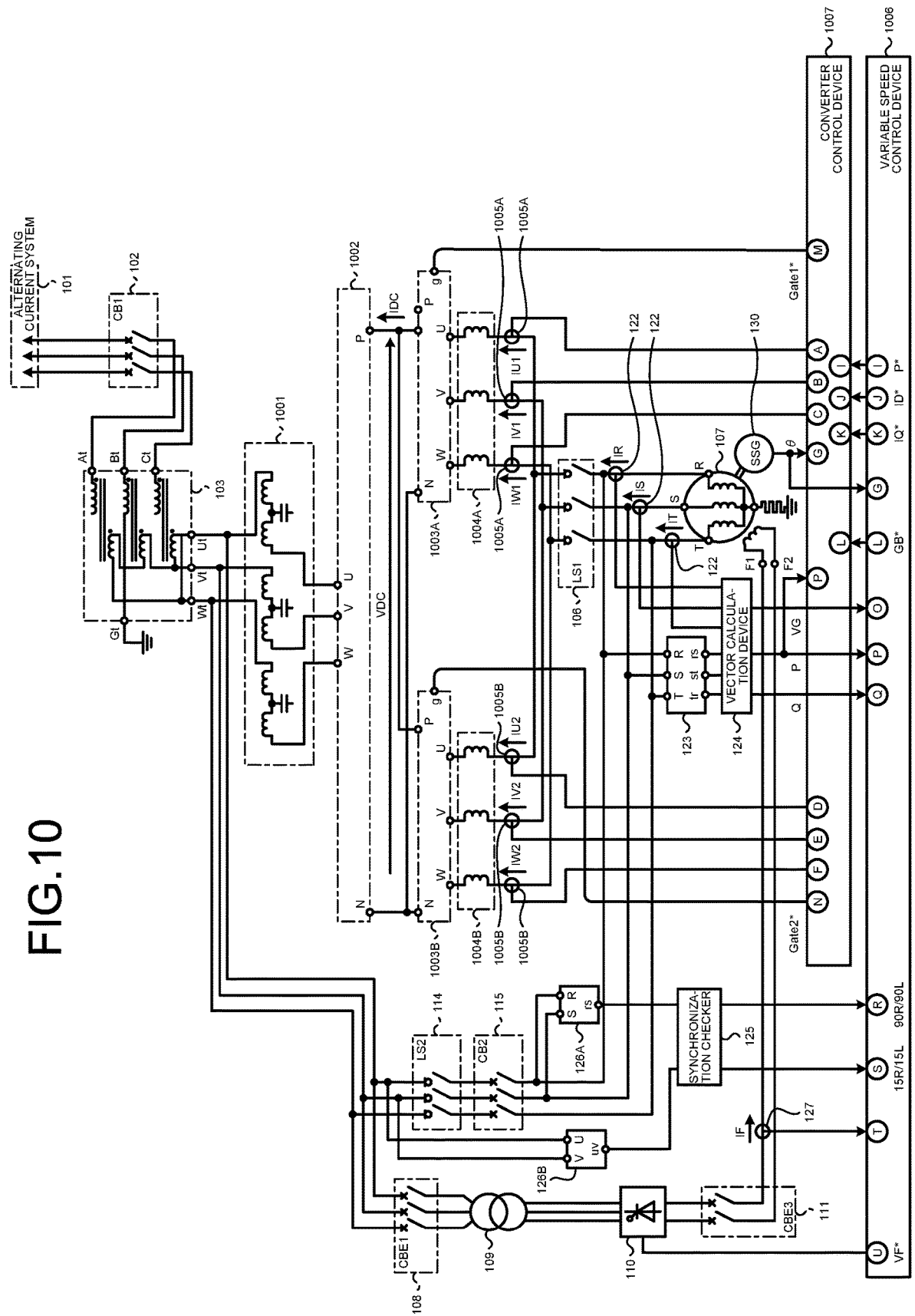
FIG. 10 is a circuit diagram illustrating a second embodiment of the present invention.

FIG. 10 is a circuit diagram illustrating a second embodiment of the present invention. The same reference numerals as those in FIG. 1 described above denote the same content, and therefore, will not be described to avoid repetition.

The three-phase terminals (Ut, Vt, and Wt) of the main transformer 103 are connected to the three-phase terminals (U, V, and W) of a direct current power supply device 1002 through a harmonic filter 1001. This harmonic filter includes reactors serving as current-limiting elements connected in series with the above-described connection lines. The first terminal (P) of the direct current power supply device 1002 is connected in a star configuration to the first terminal (P) of a direct current power supply device 1003A and the first terminal (P) of a direct current power supply device 1003B. The second terminal (N) of a direct current power supply device 1002A is connected in a star configuration to the second terminal (N) of the direct current power supply device 1003A and the second terminal (N) of the direct current power supply device 1003B. The three-phase terminals (U, V, and W) of the direct current power supply device 1003A and the three-phase terminals (U, V, and W) of the direct current power supply device 1003B are connected to first three-phase terminals of the load switch (LS1) 106 in a star configuration on a phase-to-phase basis. A current-limiting reactor 1004A and a direct current transformer 1005A is provided between the star connection points and the three-phase terminals (U, V, and W) of the direct current power supply device 1003A. A current-limiting reactor 1004B and a direct current transformer 1005B are provided between the star connection points and the three-phase terminals (U, V, and W) of the direct current power supply device 1003B.

Second three-phase terminals of the load switch (LS1) 106 are connected to the three-phase terminals (R, S, and T) of the synchronous machine 107 having an excitation winding, and branch points are provided on connection lines therebetween. The measurement, current transformer 122 is provided between the branch points and the three-phase terminals (R, S, and T).

These branch points are connected to the three-phase terminals (Ut, Vt, and Wt) of the main transformer 103 through the bypass switch load switch (LS2) 114 and the overcurrent protection breaker (CB2) 115.

Reference numeral 1006 denotes a variable speed control device. The measurement current transformer 122 and the measurement voltage transformer 123 for measuring the line-to-line voltages among the three-phase terminals (R, S, and T) of the synchronous machine 107 having an excitation winding are connected to the vector calculation device 124.

Reference numeral 125 denotes the synchronization checker that receives the voltages from the measurement voltage transformer 126B provided between the terminals on the main transformer 103 side of the bypass switch load switch (LS2) 114 and from the measurement voltage transformer 126A provided between the terminals of the overcurrent protection breaker (CB2) 115 closer to the synchronous machine 107 having an excitation winding, and outputs the voltage increase and decrease commands 90R and 90L and the frequency increase and decrease commands 15R and 15L to the variable speed control device 1006. Reference numeral 127 denotes the measurement current transformer that outputs the excitation current of the synchronous machine 107 having an excitation winding to the variable speed control device 1006.

Reference numeral 1007 denotes a converter control device that receives three signals (IU1, IV1, and IW1) from the direct current transformer 1005A, three signals (IU2, IV2, and IW2) from 1005B, the rotational phase signal θ expressed in electrical angle from the phase detector 130, and the effective power measurement signal P from the vector calculation device, and performs the control calculation, and outputs a gate signal (Gate1*) to the direct current power supply device 1003A and outputs a gate signal (Gate2*) to the direct current power supply device 1003B.

Figure 11A:
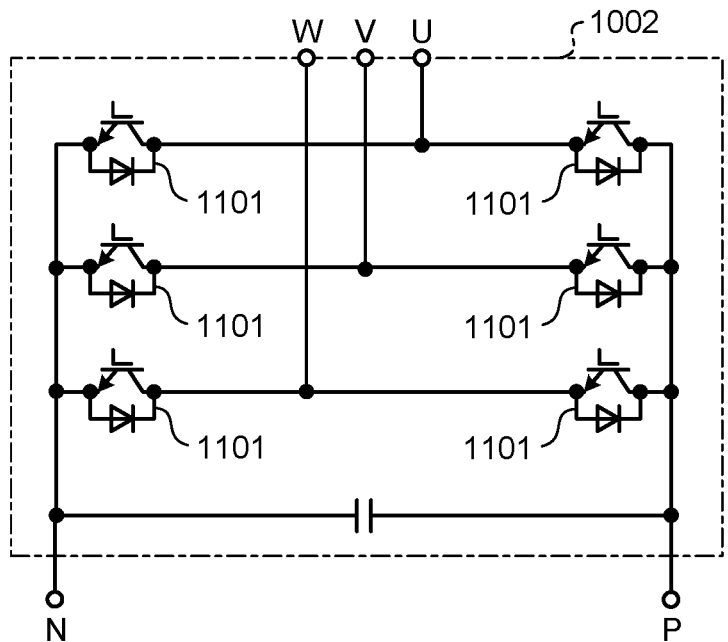
FIG. 11A is a circuit diagram of a VSC converter illustrating the second embodiment of the present invention
Figure 11B:
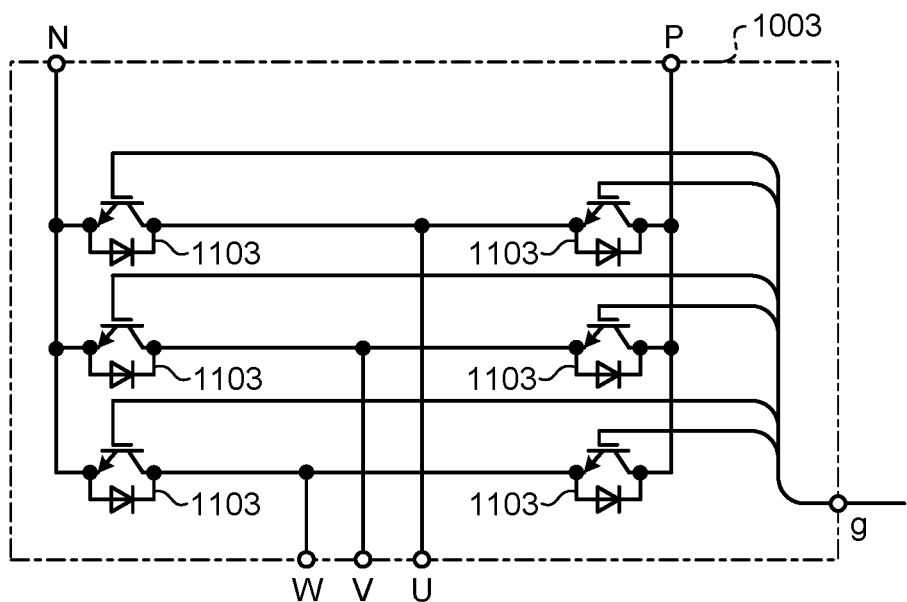
FIG. 11B is a circuit diagram of another VSC converter illustrating the second embodiment of the present invention

FIGS. 11A and 11B are circuit diagrams of the direct current power supply device 1002 and a direct current power supply device 1003 illustrating the second embodiment. The direct current power supply device 1003 represents the direct current power supply devices 1003A and 1003B that have the same circuit configuration. The direct current power supply device 1002 is a two-level PWM converter circuit obtained by connecting self-turn-off switching elements 1101 in a Graetz configuration, and includes a direct current capacitor 1102 connected between the first terminal (P) and the second terminal (N). The direct current power supply device 1003 is a two-level PWM converter circuit constituted by self-turn-off switching elements 1103 in the same manner as 1002.

Figure 12:
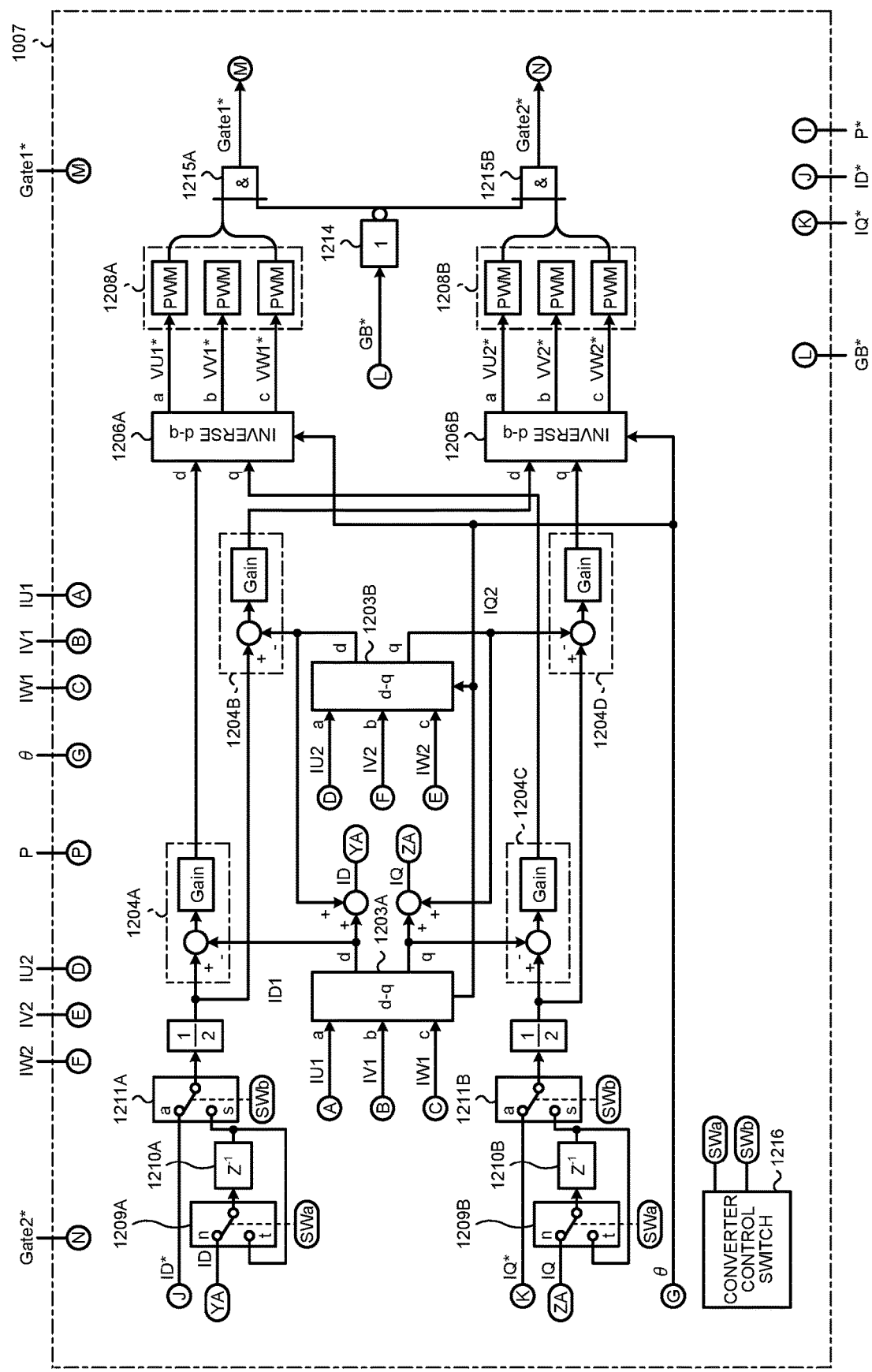
FIG. 12 is a block diagram of a converter control device illustrating the second embodiment of the present invention.

FIG. 12 is a control block diagram of the converter control device 1007 illustrating the second embodiment.

Reference numeral 1203A denotes a d-q converter that performs calculation of Expression 4. A d-q converter 1203B performs calculation of Expression 5. In Expressions 4 and 5, the phase order is U-V-W.

[Expression 4]

$$\begin{bmatrix} IQ1 \\ ID1 \end{bmatrix} = \sqrt{\frac{2}{3}} \begin{bmatrix} \cos\theta & \cos(\theta - 2\pi/3) & \cos(\theta + 2\pi/3) \\ \sin\theta & \sin(\theta - 2\pi/3) & \sin(\theta + 2\pi/3) \end{bmatrix} \begin{bmatrix} IU1 \\ IV1 \\ IW1 \end{bmatrix} \quad (4)$$

[Expression 5]

$$\begin{bmatrix} IQ2 \\ ID2 \end{bmatrix} = \sqrt{\frac{2}{3}} \begin{bmatrix} \cos\theta & \cos(\theta - 2\pi/3) & \cos(\theta + 2\pi/3) \\ \sin\theta & \sin(\theta - 2\pi/3) & \sin(\theta + 2\pi/3) \end{bmatrix} \begin{bmatrix} IU2 \\ IV2 \\ IW2 \end{bmatrix} \quad (5)$$

Reference numerals 1204A and 1204C denote alternating current adjusters that respectively perform control calculation such that command values obtained by halving the command values ID* and IQ* match with measurement calculation values ID1 and IQ1. 1204B and 1204D respectively perform control calculation such that command values obtained by halving the command values ID* and IQ* match with ID2 and IQ2.

Reference numerals 1206A and 1206B denote inverse d-q conversion calculators, each of which calculates Expression 6.

[Expression 6]

$$\begin{bmatrix} a \\ b \\ c \end{bmatrix} = \sqrt{\frac{2}{3}} \begin{bmatrix} \cos\theta & \sin\theta \\ \cos(\theta - 2\pi/3) & \sin(\theta - 2\pi/3) \\ \cos(\theta + 2\pi/3) & \sin(\theta + 2\pi/3) \end{bmatrix} \begin{bmatrix} d \\ q \end{bmatrix} \quad (6)$$

Based on outputs VU1*, VV1*, and VW1* of the inverse d-q conversion calculator 1206A, a PWM calculator 1208A outputs the gate command Gate1* to the direct current power supply device 1003A.

Based on outputs VU2*, VV2*, and VW2* of the inverse d-q conversion calculator 1206B, a PWM calculator 1208B outputs the gate command Gate2* to the direct current power supply device 1003B.

Reference numeral 1209A denotes a command switch that selectively outputs the current calculation value ID when the binary selection command value SWa is in the state n, or an output of a previous value output unit 1210A when the command value SWa is in the state t. Through this operation, the command switch 1209A holds the current calculation value ID when the command value SWa is switched from the state n to the state t, and outputs the held value when the command value SWa is in the state t. A command switch 1211A selectively outputs the current command ID* when the binary selection command value SWb is in the state a, or the output of the previous value output unit 1210A when the command value SWb is in the states.

Reference numeral 1209B denotes a command switch that selectively outputs the current calculation value IQ when the binary selection command value SWa is in the state n, or an output of a previous value output unit 1210B when the command value SWa is in the state t. Through this operation, the command switch 1209B holds the current calculation value IQ when the command value SWa is switched from the state n to the state t, and outputs the held value when the command value SWa is in the state t. A command switch 1211B selectively outputs the current command IQ* when the binary selection command value SWb is in the state a, or the output of the previous value output unit 1210B when the command value SWb is in the state s.

When the gate block signal GB* is set to one, the gate commands Gate1* and Gate2* are forced to stop by a NOT circuit 1214 and gate output blocking circuits 1215A and 1215B. As a result, all the switching elements 1103 of the direct current power supply device 1003A and the direct current power supply device 1003B are prevented from generating arcs.

Reference numeral 1216 denotes a converter control switch that selectively produces a binary output of the command value SWa or the command value SWb according to the desired operation mode.

Figure 13:
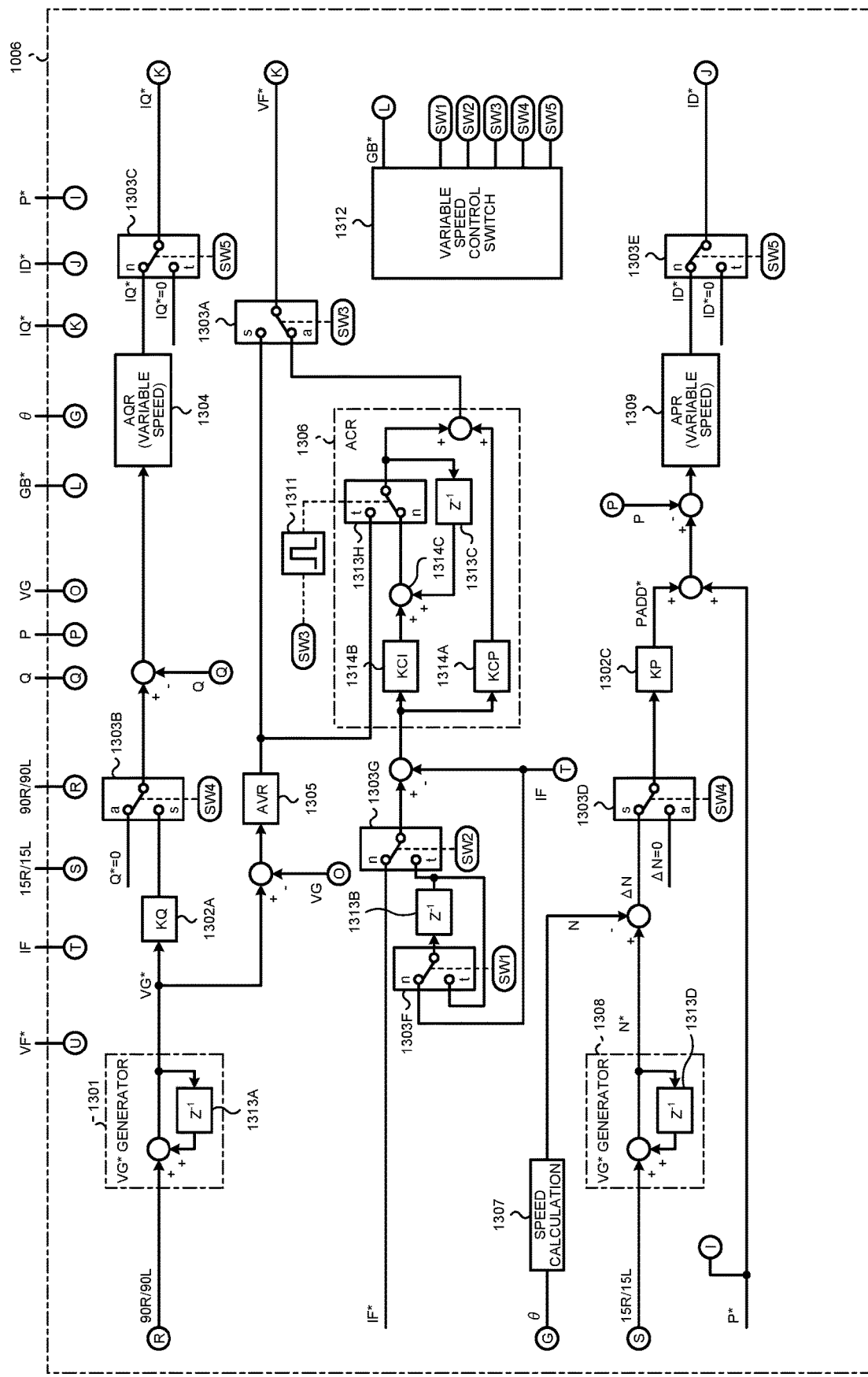
FIG. 13 is a block diagram of a variable speed control device illustrating the second embodiment of the present invention.

FIG. 13 is a control block diagram of the variable speed control device 1006 illustrating the second embodiment.

Reference numeral 1301 denotes a voltage command generator that receives the voltage increase command 90R and the voltage decrease command 90L from the synchronization checker 125, and outputs a result obtained by integrating the received command values using a previous value output unit 1313A as the voltage command VG*. The voltage command VG* is converted into the reactive power command Q* by a constant gain (KQ) 1302A. A reactive power adjuster 1304 receives a comparison result between the reactive power command Q* and the reactive power Q received from the vector calculation device 124, and outputs the current command IQ* to the converter control device 1007.

A generator voltage adjuster 1305 receives a comparison result between the voltage command VG* and the generator voltage VG received from the vector calculation device 124, and produces an output to a command switch 1303A.

An excitation current adjuster 1306 receives a comparison result between the excitation current command IF* and the excitation current IF received from the measurement current transformer 127, and produces an output to the command switch 1303A.

The excitation current adjuster 1306 uses a constant gain 1314A equivalent to the proportional gain (KCP), a constant gain 1314B equivalent to the integral gain (KCI), a previous value output unit 1313C, and an adder 1314C to cumulatively add the output of the constant gain 1314B, and outputs the result as the proportional-integral control calculation result.

The command switch 1303A selects the output of the generator voltage adjuster 1305 when the command value SW3 is in the state s, or selects the output of the excitation current adjuster 1306 when the command value SW3 is in the state a, and outputs the result as the excitation voltage command VF* to the excitation converter 110.

Reference numeral 1307 denotes a speed calculator that calculates the rotational speed N from the output 9 of the rotational phase detector 130.

Reference numeral 1303 denotes a speed command generator that receives the frequency increase command 15R and the frequency decrease command 15L from the synchronization checker 125, and outputs a result obtained by integrating the received command values using a previous value output unit 1313D as the speed command N*.

The difference ΔN between the speed command N* and the rotational speed N is converted into the effective power correction command PADD* by a constant gain (KP)

1302C. The effective power correction command PADD* is added to the effective power command P*; the result is compared with the effective power P received from the vector calculation device 124; and the result is supplied to and adjusted by an effective power adjuster 1309 to be the current command ID*, which is output to the converter control device 1007.

Reference numeral 1303B denotes a command switch that outputs the output of the constant gain (KQ) 1302A when the command value SW4 is in the state s, or outputs zero when the command value SW4 is in the state a.

Reference numeral 1303C denotes a command switch that outputs the current command IQ* when the command value SW5 is in the state n, or outputs zero when the command value SW5 is in the state t.

Reference numeral 1303D denotes a command switch that outputs ΔN mentioned above when the command value SW4 is in the state s, or outputs zero when the command value SW4 is in the state a.

Reference numeral 1303E denotes a command switch that outputs the current command ID* when the command value SW5 is in the state n, or outputs zero when the command value SW5 is in the state t.

Reference numeral 1303F denotes a command switch that selectively outputs an output of a previous value output unit 1313B when the command value SW1 is in the state t, or the excitation current IF from the measurement current transformer 127 when the command value SW1 is in the state n, and supplies the selective output to the previous value output unit 1313B.

Reference numeral 1303G denotes a command switch that selectively outputs the excitation current command IF* when the command value SW2 is in the state n, or the output of the previous value output unit 1313B when the command value SW2 is in the state t.

A rise detector 1311 sets a command to a command switch 1303H to the state t only during an operation of detecting a change in the command value SW3 from the state s to the state a, and returns the command to the state n during the next operation. The rise detector 1311 holds the command to the command switch 1303H in the state n during the operation of detecting a change in the command value SW3 from the state a to the state s, and also holds the command to the command switch 1303H in the state n when the command value SW3 does not change.

Reference numeral 1303H denotes the command switch that switches to an adder output equivalent to an integral calculation result when the command value from the rise detector 1311 is in the state n, or resets the integral calculation result and switches to the output from the generator voltage adjuster 1305 when the command value from the rise detector 1311 is in the state t.

Reference numeral 1312 denotes a variable speed control switch that selectively produces a binary output of each of the command value SW1, the command value SW2, the command value SW3, the command value SW4, and the command value SW5, according to the desired operation mode. The variable speed control switch 1312 also outputs the gate block signal GB* to the converter control device 1007.

Figure 14:
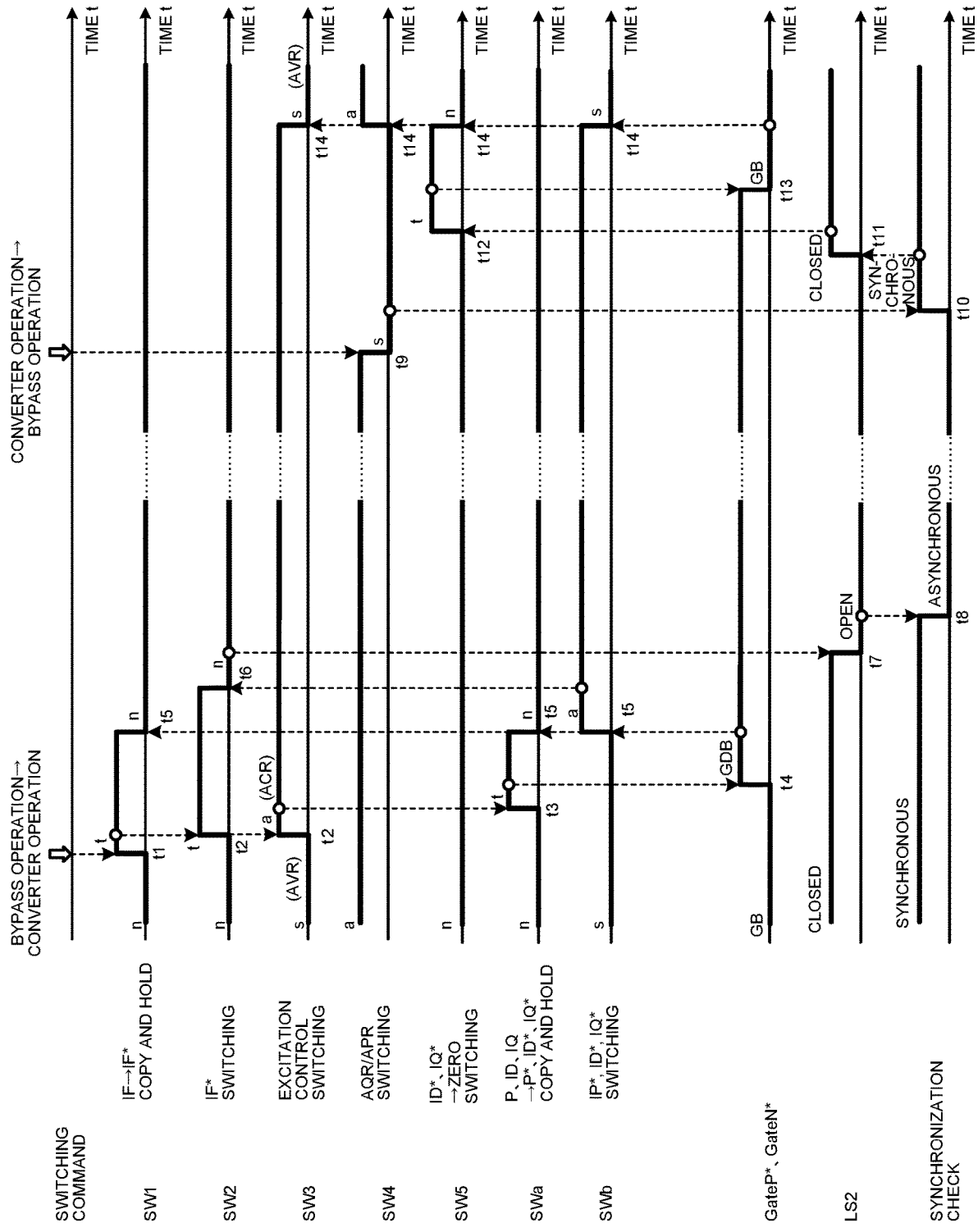
FIG. 14 is an operation sequence illustrating the second embodiment of the present invention.

FIG. 14 is an operation sequence illustrating the second embodiment of the present invention.

The following describes a method of switching from the bypass operation to the converter operation.

First, the states during the bypass operation will be described from the top row of FIG. 14 downward.

The command value SW1 is in the state n. The previous value output unit 1313B continues updating the excitation current IF. Thus, the operation is prepared for being switched to the converter operation. The command value SW2 is in the state n. The command switch 1303G continues updating the excitation current command IF*. Thus, the operation is prepared for being switched to the converter operation. SW3 is in the state s. The command switch 1303A selects the output from the generator voltage adjuster 1305, and outputs the result as the excitation voltage command VF*, which is controlled in voltage by the generator voltage adjuster 1305. SW4 is in the state a. The command switch 1303B selectively outputs the reactive power command Q*=0 (command that power factor=1), and holds the initial state in preparation for the switching to the converter operation. The command switch 1303D selectively outputs the speed deviation ΔN=0, and holds the initial state in preparation for the switching to the converter operation. The state of the variable speed control device 1006 is as described above.

The command value SWa is in the state n. The previous value output unit 1210A continues updating the converter current ID. The previous value output unit 1210B continues updating the converter current IQ. A previous value output unit 1210C continues updating the effective power P. Thus, the operation is prepared for being switched to the converter operation. The command value SWb is in the state s. The command switch 1211A continues updating the converter current ID. The command switch 1211B continues updating the converter current IQ. Thus, the operation is prepared for being switched to the converter operation. The state of the converter control device 1007 is as described above.

The level of the gate block command GB* is one, so that the gate command Gate1* to the direct current power supply device 1003A and the gate command Gate2* to the direct current power supply device 1003B are in the GB state.

The bypass switch load switch (LS2) 114 is in the closed state. The synchronization checker 125 produces no output (90R/90L and 15R/15L). The bypass operation state is as described above.

When the variable speed control device 1006 receives a switching command to the converter operation at time t1, the command value SW1 changes to the state t, and the previous value output unit 1313B holds the excitation current IF at the time of the change in the state of SW1.

At time t2 after the sampling period Δt has elapsed from time t1, SW2 changes to the state s, and the command switch 1303G holds the value of the excitation current IF at time t1. SW3 changes to the state a, and the excitation voltage command VF* is switched to the output of the excitation current adjuster 1306. At the time when SW3 changes to the state a, a one-shot operation of the command switch 1303H replaces the integrator output of the excitation current adjuster 1306 with a value of the excitation voltage command VF* immediately before the change. This operation ensures the continuity of the excitation voltage command VF*.

After the command value SWa changes to the state t at time t3, the previous value holder 1210A holds the current ID at the time of the change in the state of the command value SWa, and the previous value output unit 1210B holds the current IQ at the time of the change in the state of the command value SWa.

At time t4 after the sampling period Δt has elapsed from time t3, the level of the gate block, command GB* changes to zero; the gate commands Gate1* and Gate2* are placed in the GDB state; and the direct current power supply devices 1003A and 1003B start operating.

At time t4, the bypass operation period ends, and the commutation period from the bypass operation to the converter operation starts.

After the command value SWb changes to the state a at time t5, the command switch 1211A is switched to the current command ID* from the variable speed control device 1006, and the command switch 1211B is switched to the current command IQ*. Thus, the converter control device 1007 completes the switching to the converter operation mode. At time t5, SW1 is switched to the state n, and SWa is switched to the state n. Thus, the operation is prepared for being switched to the bypass operation.

After the command value SW2 changes from the state t to the state n at time t6, the command switch 1303G is switched to the excitation current command IF*.

Time t7 is set using the commutation period from the bypass switch load switch (LS2) 114 to the direct current power supply devices 1003A and 1003B as a guide. Since the commutation period can be adjusted to be much shorter than an output change period of the synchronous machine 107 having an excitation winding, the current of the bypass switch load switch (LS2) 114 can be quickly reduced to zero. When the bypass switch load switch (LS2) 114 is closed at time t7, the commutation period ends, and the converter operation period starts.

At time t8, the voltage supplied to the synchronization checker 125 is placed in the asynchronous state. However, at this time, excluding the synchronization checking function does not cause the outputs (90R/90L and 15R/15L) to affect the variable speed control device 1006 and the converter control device 1007.

The following describes the method of switching from the converter operation to the bypass operation.

When the variable speed control device 1006 receives a switching command to the bypass operation at time t9, the command value SW4 changes to the state s; the command switch 1303B is switched to the output of the constant gain 1302A, which is KQ times the voltage command VG*. This operation starts the generator voltage adjustment by the voltage increase command 90R and the voltage decrease command 90L from the synchronization checker 125. The command switch 1303D is switched to a value changing with time according to the deviation ΔN between the rotational speed command N* and the rotational speed N, thus starting the generator voltage adjustment by the frequency increase command 15R and the frequency decrease command 15L from the synchronization checker 125.

At time t10, the synchronization checker 125 detects the synchronization.

At time t11, the bypass switch load switch LS2 is closed; the converter operation period ends; and the commutation period from the converter operation to the bypass operation starts.

At time t12, the command value SW5 is switched to the state t; the command switch 1303C switches the current command IQ* to zero; the command switch 1303E switches the current command ID* to zero; and the currents of the direct current power supply devices 1003A and 1003B are reduced to zero.

At time t13, the level of the gate block command GB* is changed to one; the gate commands Gate1* and Gate2* are placed in the GB state; and the direct current power supply devices 1003A and 1003B stop.

When the direct current power supply devices 1003A and 1003B stop at time t13, the commutation period ends, and the bypass operation period starts.

At time t14, the command SW3 is switched to the state s, and the excitation voltage command VF* is switched from the excitation current adjuster 1306 to the generator voltage adjuster 1305, thus, the state is switched to the normal synchronous machine control state. At time t14, SW4 is switched to the state a; SW5 is switched to the state n; and SWb is switched to the state s. Thus, the operation is prepared for being switched to the converter operation. According to the above, the state before time t1 is restored.

Third Embodiment

Figure 15:
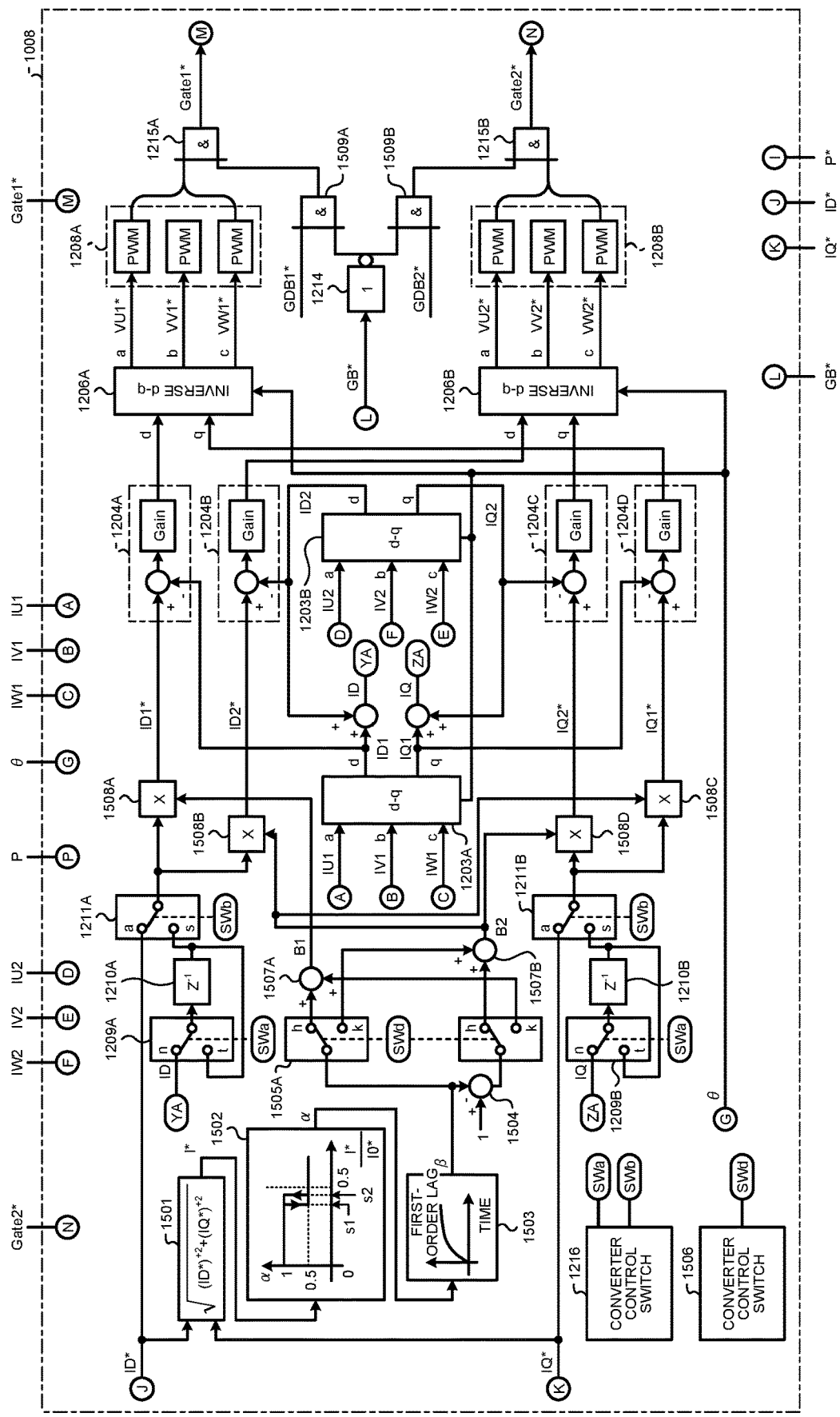
FIG. 15 is a block diagram of a converter control device illustrating a third embodiment of the present invention.
Figure 16:
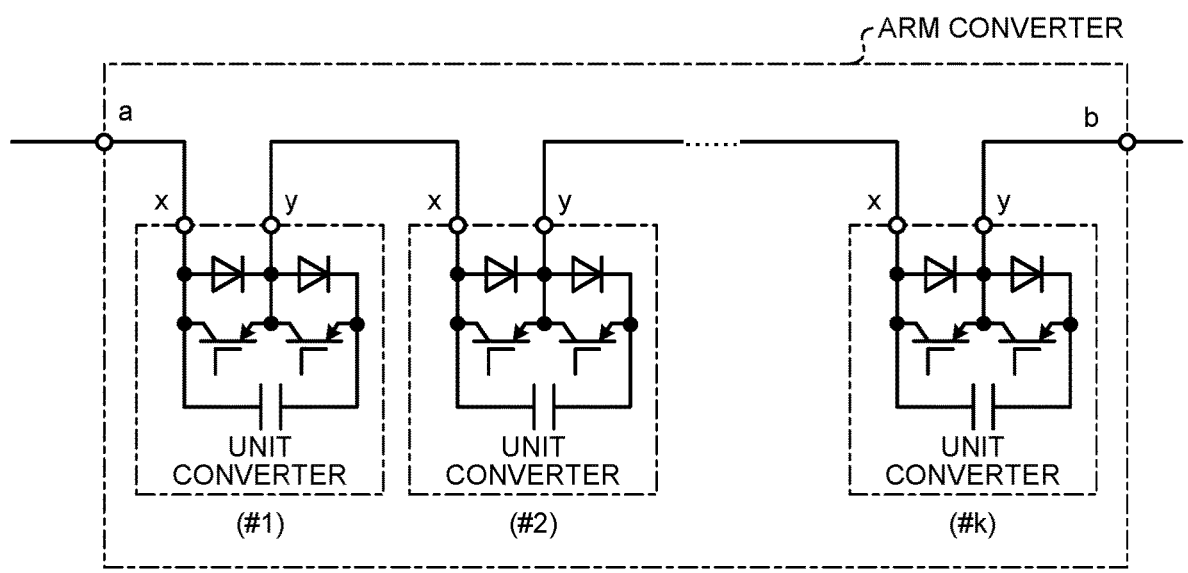
FIG. 16 is a circuit diagram of an arm converter included in an MMC converter.
Figure 17A:
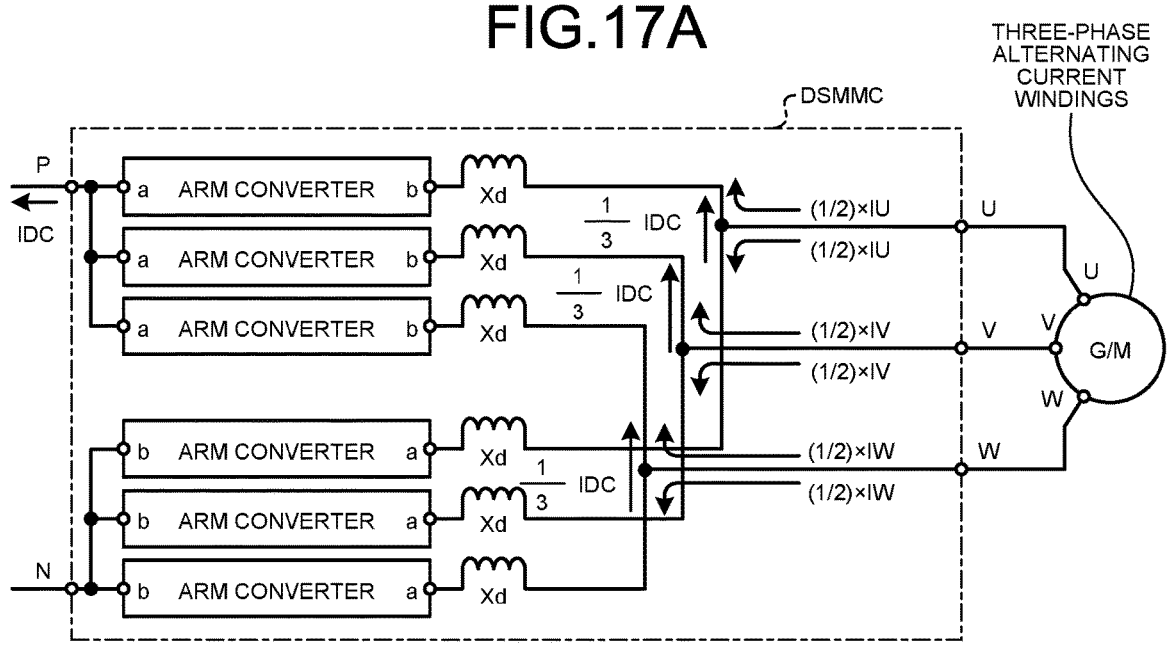
FIG. 17A is a circuit diagram of a variable speed generator/motor device obtained by connecting an MMC converter to a generator/motor.
Figure 17B:
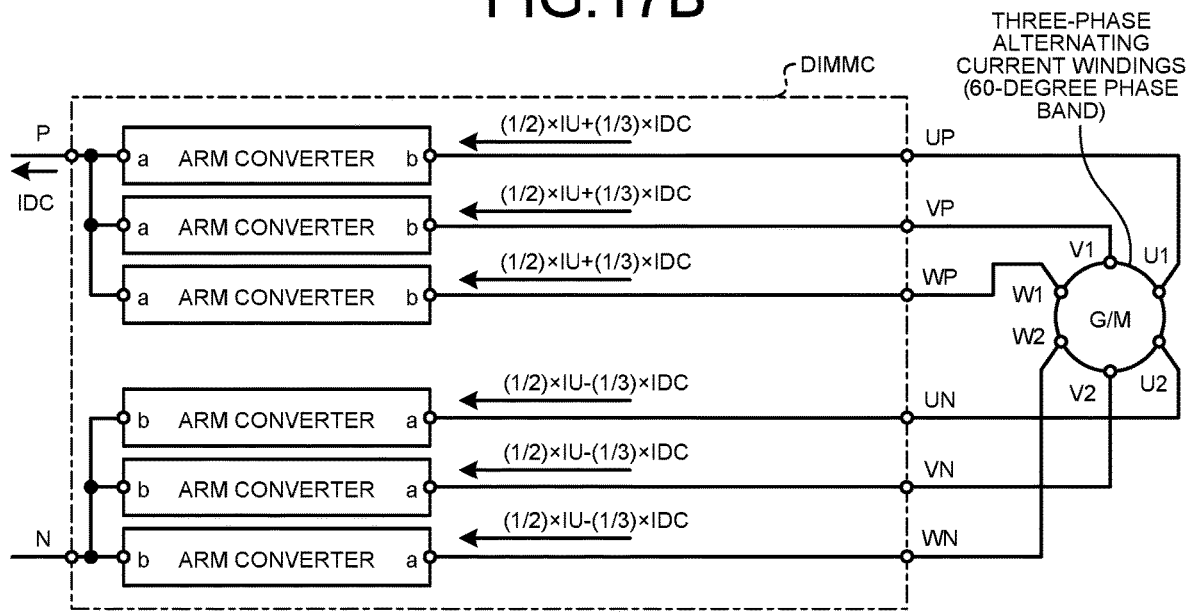
FIG. 17B is a circuit diagram of another variable speed generator/motor device obtained by connecting an MMC converter to a generator/motor.
Figure 17C:
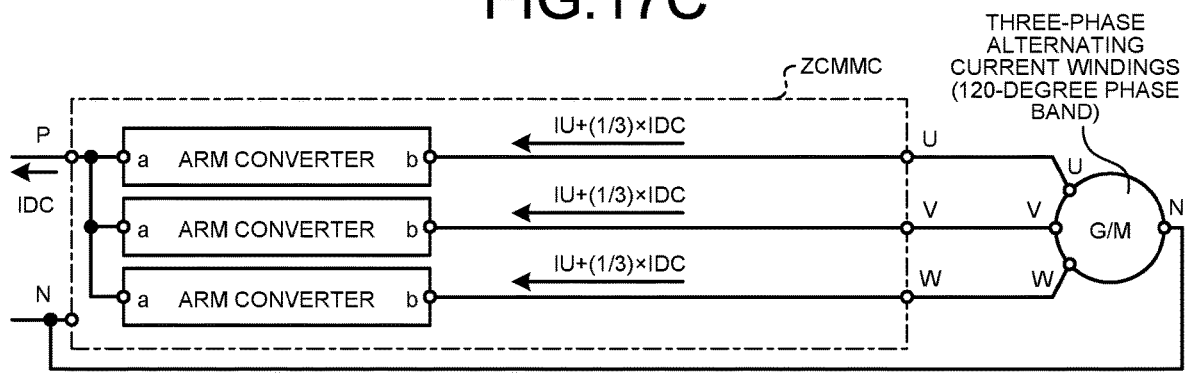
FIG. 17C is a circuit diagram of still another variable speed generator/motor device obtained by connecting an MMC converter to a generator/motor.
Figure 18:
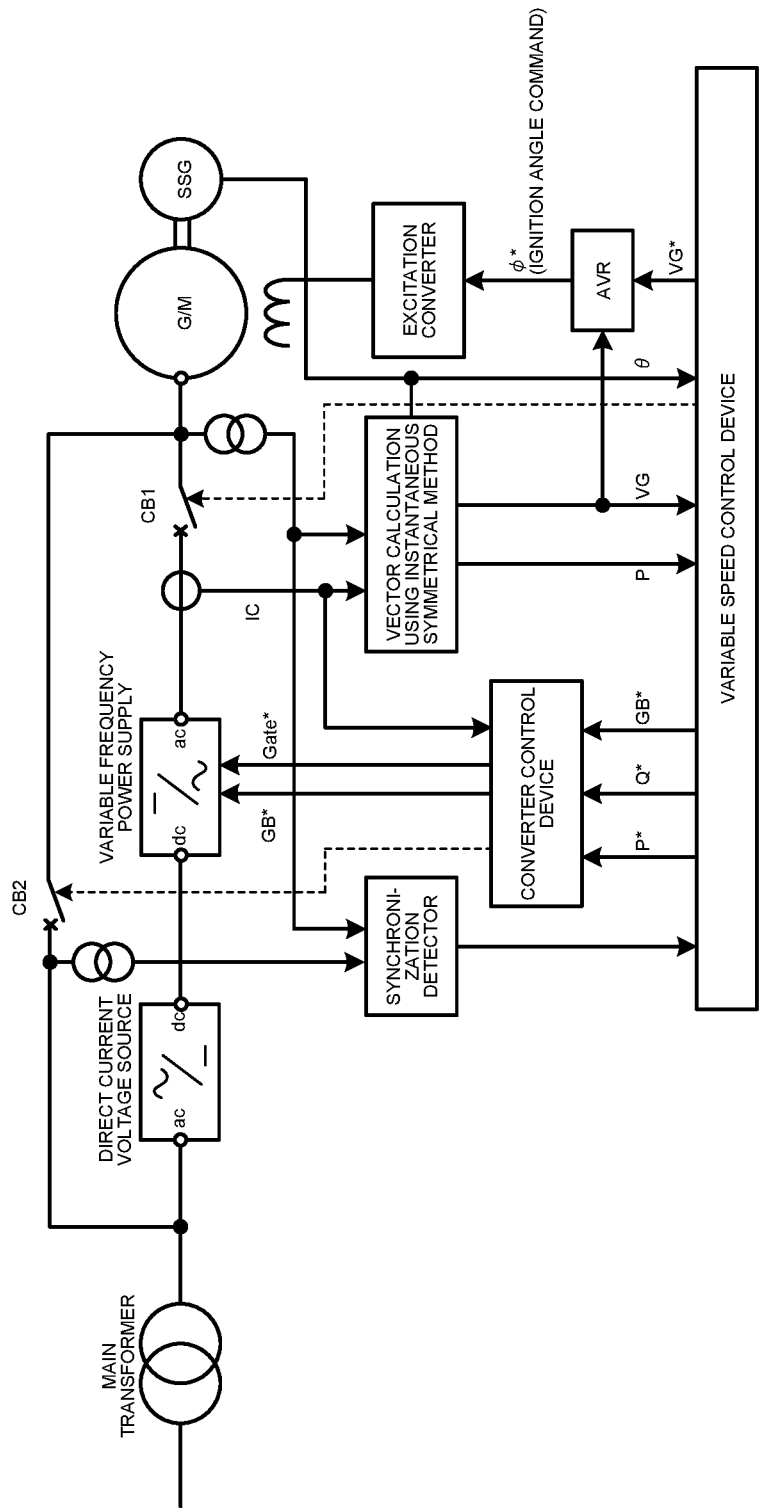
FIG. 18 is a circuit diagram of a variable speed generator/motor device using a conventional technology.
Figure 19:
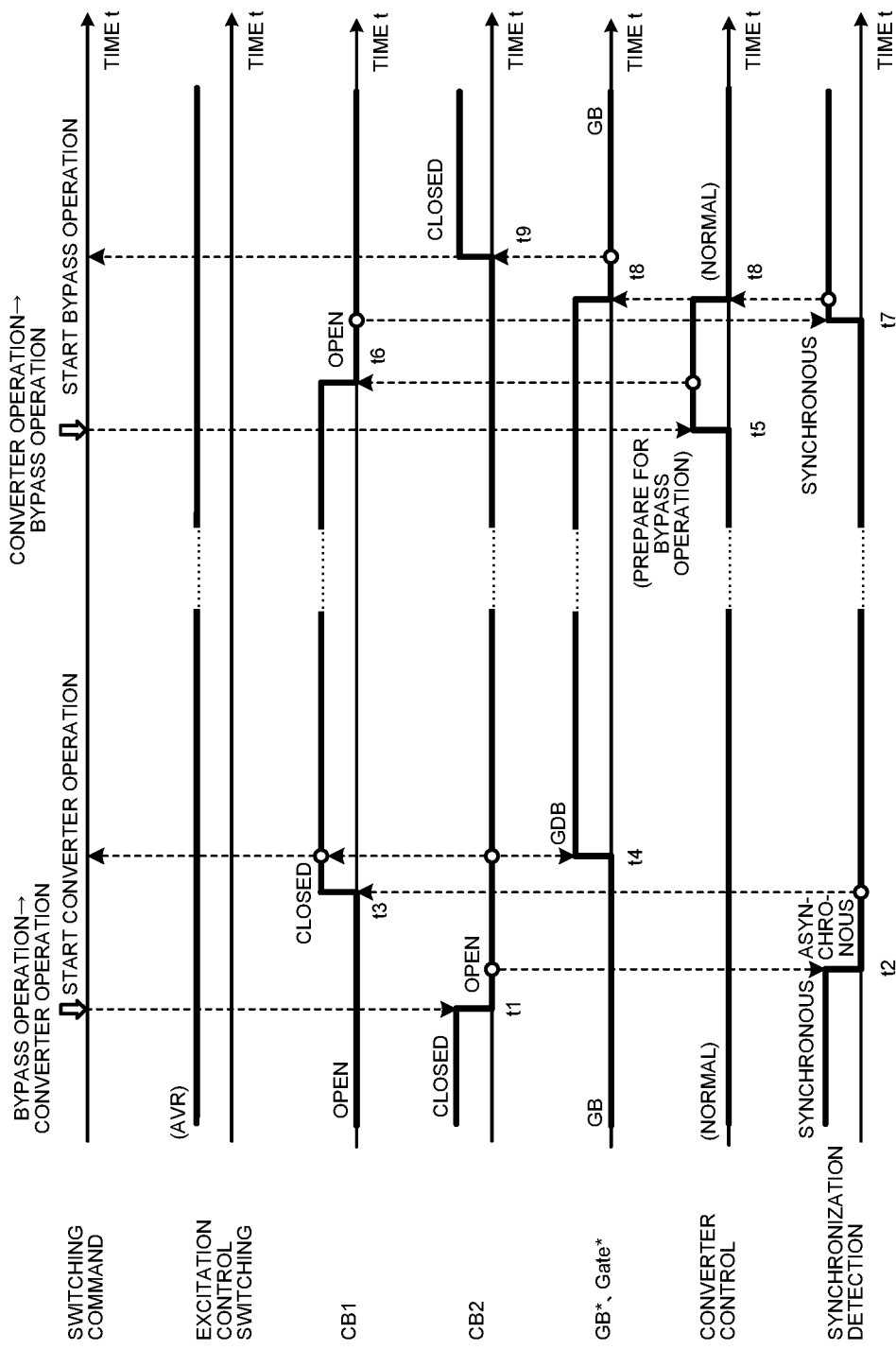
FIG. 19 is an operation sequence of the variable speed generator/motor device using the conventional technology.
Figure 20:
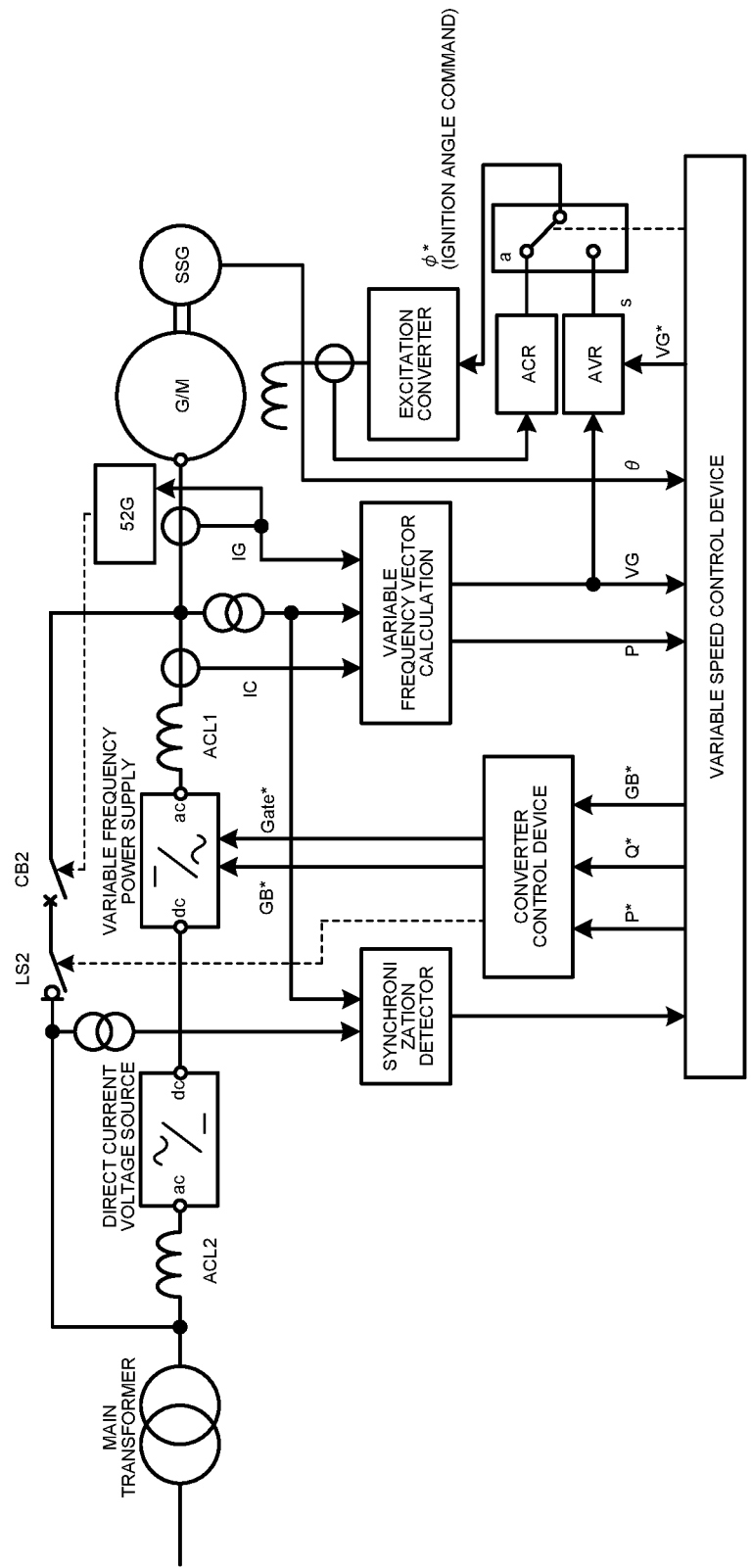
FIG. 20 is a circuit diagram illustrating means for achieving the object of the present invention.
Figure 21A:
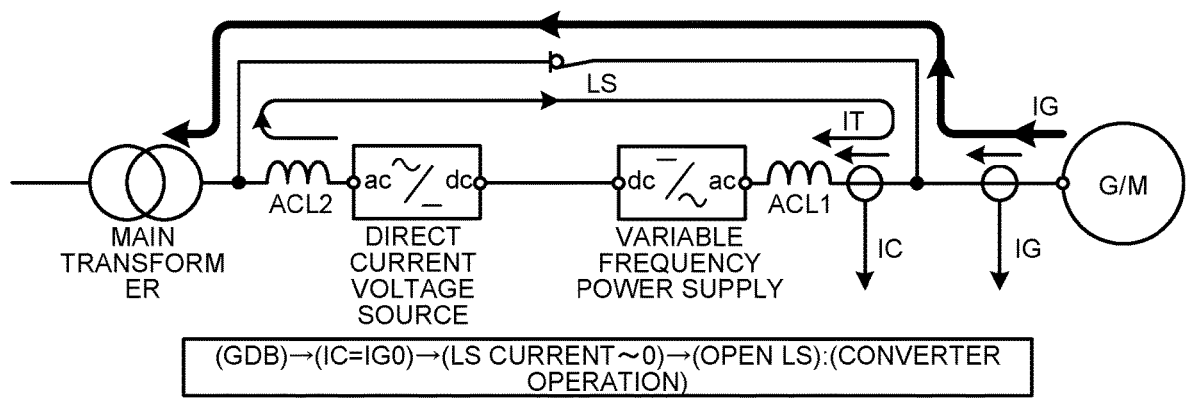
FIG. 21A is a circuit diagram illustrating a commutation state of a variable speed generator/motor device using the present invention.
Figure 21B:
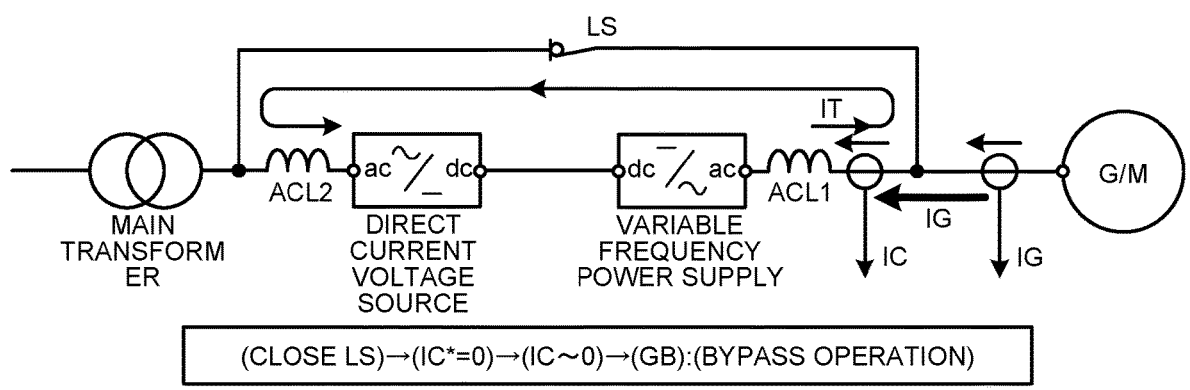
FIG. 21B is a circuit, diagram illustrating another commutation state of the variable speed generator/motor device using the present invention.

FIG. 15 is a block diagram of a converter control device 1008 illustrating a third embodiment of the present invention. The same reference numerals as those in FIG. 12 described above denote the same content, and therefore, will not be described to avoid repetition.

Reference numeral 1501 denotes a root sum square calculator 1501 that receives the current commands ID* and IQ*, and outputs a current command amplitude I*.

Reference numeral 1502 denotes a current distribution calculator that receives a current command ratio (I*/I0*) between the current command amplitude I* and a rated current I0* of the direct current power supply devices 1003A and 1003B, and outputs a current distribution ratio α. The current command ratio (I*/I0*) increases from zero, and when having reached a set value s1, switches the current division ratio α from one to 0.5. The current command ratio (I*/I0*) decreases from one, and when having reached a set value s2, switches the current division ratio α from 0.5 to 1. The set values s1 and s2 have a hysteresis characteristic such that, s1<s2<0.5.

The present embodiment provides an effect that the hysteresis characteristic reduces the frequency of switching of the current distribution ratio α, and further stable operation is achieved.

Reference numeral 1503 denotes a first-order lag circuit that outputs a current distribution command β based on the current distribution ratio α, and sets a command to a command switch 1505A to β and a command to a command switch 1505B to (1−β) through an adder 1504.

When a command value SWd is switched to a state h, the command switch 1505A and the command switch 1505B set an input to multipliers 1508A and 1508C to β1=β and an input to multipliers 1508B and 1508D to β2=(1−β) through adders 1507A and 1507B. When the command value SWd is switched to a state k, the command switch 1505A and the command switch 1505B set the input to the multipliers 1508A and 1508C to β1=(1−β) and the input to the multipliers 1508B and 1508D to β2=β.

A converter selection switch 1506 switches the command value SWd between the state h and the state k. The switching equalizes use rates of the direct current power supply devices 1003A and 1003B. The switching timing may be each time the direct current power supply device starts, or each time the generator/motor device starts.

According to the present embodiment, the converter selection switching equalizes the use rates of the direct current power supply devices, and thus, provides an effect of achieving the operation that allows a longer life and longer intervals of maintenance.

When the current distribution command β1 is zero, switching a command GDB1* to a gate blocking circuit 1509A from one to zero stops Gate1*, and thus, can reduce a turn-on loss and a turn-off loss of the direct current power supply device 1003A.

When the current distribution command β2 is zero, switching a command GDB2* to a gate blocking circuit 1509B from one to zero stops Gate2*, and thus, can reduce the turn-on loss and the turn-off loss of the direct current power supply device 1003B.

REFERENCE SIGNS LIST

- 101 Alternating current system
- 102 System breaker
- 103 Main transformer
- 104A, 104B, 704, 1002, 1003, 1003A, 1003B Direct current power supply device
- 105, 105A, 105B, 105UP, 105VP, 105WP, 105UN, 105VN, 105WN, 105X Arm converter
- 106 Load switch
- 107 Synchronous machine having an excitation winding
- 108 Excitation breaker
- 109 Excitation transformer
- 110 Excitation converter
- 111, 113 Excitation winding breaker
- 112, 118 Current-limiting resistor
- 114 Bypass switch load switch
- 115 Overcurrent protection breaker
- 116 Initial charge transformer
- 117, 119, 120 Initial charge breaker
- 121, 1006 Variable speed control device
- 122, 127 Measurement current transformer
- 123, 126A, 126B Measurement voltage transformer
- 124 Vector calculation device
- 125 synchronization checker
- 128, 1007, 1008 Converter control device
- 129, 308, 1005A, 1005B Direct current transformer
- 130 Rotational phase detector
- 201 Unit converter
- 202, 1004A, 1004B Current-limiting reactor
- 301, 302 Switching element
- 303 Capacitor
- 304 Optical communication cable
- 305 Optical-to-electrical conversion element
- 306 Serial-to-parallel conversion circuit
- 307 Gate driver
- 309 Analog-to-digital converter
- 310 Parallel-to-serial conversion circuit
- 311 Electrical-to-optical conversion element
- 401, 507, 1201, 1307 Speed calculator
- 402A, 402B, 1202A, 1202B Moving average calculator
- 403A, 403B, 1203A, 1203B d-q converter
- 404A, 404B, 1204A, 1204B, 1204C, 1204D Alternating current adjuster
- 405A, 405B Direct current adjuster
- 406A, 406B, 1206A, 1206B Inverse d-q converter
- 407A, 407B Direct current voltage command correction calculator
- 408A, 408B, 1208A, 1208B PWM calculator
- 409A, 409B, 409C, 411A, 411B, 411C, 413, 503A, 503B, 503C, 503D, 503E, 503F, 503G, 503H 1209A, 1209B, 1211A, 1211B, 1303A, 1303B, 1303C, 1303D, 1303E, 1303F, 1303G, 1303H, 1505A, 1505B Command switch
- 410A, 410B, 410C, 513A, 513B, 513C, 513D, 1210A, 1210B, 1313A, 1313B, 1313C, 1313D Previous value output unit
- 412 Divider
- 414, 1214 NOT circuit
- 415A, 415B, 1215A, 1215B, 1509A, 1509B Gate output blocking circuit
- 416, 1216 Converter control switch
- 501, 1301 Voltage command generator
- 502A, 502B, 514A, 514B, 1302A, 1302B, 1314A, 1314B Constant gain
- 504, 1304 Reactive power adjuster
- 505, 1305 Generator voltage adjuster
- 506, 1306 Excitation current adjuster
- 508, 1308 Speed command generator
- 509, 1309 Effective power adjuster
- 510 Direct current voltage command generator
- 511, 1311 Rise detector
- 512, 1312 Variable speed control switch
- 801 Three-level VSC conversion circuit
- 802 Harmonic filter
- 901 Five-level VSC conversion circuit
- 902, 1001 Harmonic filter
- 1501 Root sum square calculator
- 1502 Current distribution calculator
- 1503 First-order lag circuit
- 1504, 1507A, 1507B Adder
- 1506 Converter selection switch
- 1508A, 1508B, 1508C, 1508D Multiplier

The invention claimed is:

1. A variable speed generator/motor device comprising:
a variable frequency power converter including m unit converters (where m is a natural number equal to or larger than one), the unit converters being each provided with two direct current side terminals and three alternating side terminals, being connected in parallel through the two direct current side terminals and the three alternating side terminals, and each comprising six arm converters connected in a three-phase full wave bridge configuration, each of the arm converters being a two-terminal arm converter comprising k unit converters (where k is a natural number equal to or larger than one), one current-limiting reactor, and one direct current transformer connected to one another in series, each of the unit converters being a two-terminal unit converter capable of outputting any voltage through an energy storing element having voltage source characteristics;
a direct current voltage device including a voltage type self-excited converter connected back-to-back to the two direct current side terminals of the variable frequency power converter;
an automatic voltage adjuster configured to connect three alternating current terminals of the direct current voltage device to an alternating current system, connect three alternating current terminals of the variable frequency power converter to three alternating current terminals of a three-phase alternating current synchronous machine having an excitation winding, connect two excitation winding terminals of the three-phase alternating current synchronous machine to an excitation device, and adjust a manipulated variable for the excitation device so as to match an alternating current voltage of the three-phase alternating current synchronous machine with a command value; and
a converter current adjuster configured to control the unit converters so as to match a current value from the direct current transformer with a converter current command value, wherein
a first three-phase branch circuit is provided between the three alternating current terminals of the direct current voltage device and the alternating current system, a second three-phase branch circuit is provided between the three alternating current terminals of the variable frequency power converter and the three alternating current terminals of the three-phase alternating current synchronous machine, a first load switch for a bypass circuit is provided between the first three-phase branch circuit and the second three-phase branch circuit, a measurement current transformer is provided between three-phase alternating current terminals of the three-phase alternating current synchronous machine and the second three-phase branch circuit, and a power adjuster is provided that is configured to use a current value of the measurement current transformer to output the converter current command value to the variable frequency power converter, and a first mode switching device is provided that is configured to, when switching from a converter mode in which the variable frequency power converter drives the three-phase alternating current synchronous machine to generate power to a bypass mode in which the first load switch is closed to drive the three-phase alternating current synchronous machine to generate the power, switch the first load switch from an open state to a closed state, and subsequently stop a gate command to the unit converters, and a second mode switching device is provided that is configured to, when switching from the bypass mode to the converter mode, hold the current value of the measurement current transformer during the switching, calculate a current command value of the converter current adjuster from the current value and output the result, subsequently start the gate command to the unit converters, and subsequently open the first load switch.

2. A variable speed generator/motor device comprising:

a variable frequency power converter including a two-level, three-level, or five-level voltage type converter comprising m unit converters (where m is a natural number equal to or larger than one) each obtained by connecting six arm converters in a three-phase full wave bridge configuration and by providing two direct current side terminals and three intermediate terminals, the six arm converters each comprising k self-turn-off switching elements for pulse-width modulation (where k is a natural number equal to or larger than one), the m unit converters being connected in parallel through the two direct current side terminals, n energy storage elements (where n is a natural number equal to or larger than one) having voltage source characteristics being provided between the two direct current side terminals, first terminals of m current-limiting reactors being connected to the three intermediate terminals on a phase-to-phase basis, second terminals of the m current-limiting reactors being connected in a star configuration to serve as alternating current terminals;

a direct current voltage device including a voltage type self-excited converter connected back-to-back to the two direct current side terminals of the variable frequency power converter;

an automatic voltage adjuster configured to connect three alternating current terminals of the direct current voltage device to an alternating current system, connect three alternating current terminals of the variable frequency power converter to three alternating current terminals of a three-phase alternating current synchronous machine having an excitation winding, connect two excitation winding terminals of the three-phase alternating current synchronous machine to an excitation device, and adjust a manipulated variable for the excitation device so as to match an alternating current voltage of the three-phase alternating current synchronous machine with a command value; and a converter current adjuster configured to control the unit converters so as to match a current value from a direct current transformer with a converter current command value, wherein a first three-phase branch circuit is provided between the three alternating current terminals of the direct current voltage device and the alternating current system, a second three-phase branch circuit is provided between the three alternating current terminals of the variable frequency power converter and the three alternating current terminals of the three-phase alternating current synchronous machine, a first load switch for a bypass circuit is provided between the first three-phase branch circuit and the second three-phase branch circuit, a measurement current transformer is provided between three-phase alternating current terminals of the three-phase alternating current synchronous machine and the second three-phase branch circuit, and a power adjuster is provided that is configured to use a current value of the measurement current transformer to output the converter current command value to the variable frequency power converter, and a first mode switching device is provided that is configured to, when switching from a converter mode in which the variable frequency power converter drives the three-phase alternating current synchronous machine to generate power to a bypass mode in which the first load switch is closed to drive the three-phase alternating current synchronous machine to generate the power, switch the first load switch from an open state to a closed state, and subsequently stop a gate command to the unit converters, and a second mode switching device is provided that is configured to, when switching from the bypass mode to the converter mode, hold the current value of the measurement current transformer during the switching, calculate a current command value of the converter current adjuster from the current value and output the result, subsequently start the gate command to the unit converters, and subsequently open the first load switch.

3. The variable speed generator/motor device according to claim 1, wherein an alternating current breaker is provided between the second three-phase branch circuit and the circuit load switch, and the measurement current transformer is configured to detect an overcurrent to open the alternating current breaker.

4. The variable speed generator/motor device according to claim 1, wherein a second load switch is provided between the second three-phase branch circuit and the variable frequency converter, the first mode switching device is provided with a device configured to, when switching from the converter mode to the bypass mode, block the gate command to the unit converters, and subsequently open the second load switch, and a second mode switching device is provided that is configured to, when switching from the bypass mode to the converter mode, close the second load switch, subsequently hold the current value of the current converter during the switching, calculate the current command value of the converter current adjuster from the current value and output the result, subsequently start the gate command to the unit converters, and subsequently open the first load switch.

5. The variable speed generator/motor device according to claim 1, wherein the excitation winding of the synchronous machine having an excitation winding is provided with an excitation direct current transformer, an excitation current adjuster is provided that is configured to operate the excitation device so as to match a current of the excitation direct current transformer with an excitation current command value, the first mode switching device is provided with a device configured to, when switching from the bypass mode to the converter mode, hold and use the current value of the excitation direct current transformer as a current command value of the excitation current adjuster and subsequently perform switching from the automatic voltage adjuster to the excitation current adjuster, and the second mode switching device is provided with a device configured to, when switching from the bypass mode to the converter mode, open the first load switch and then perform switching from the excitation current adjuster to the automatic voltage adjuster.

6. The variable speed generator/motor device according to claim 5, wherein a synchronization checker is provided between the first three-phase branch circuit and the second three-phase branch circuit in parallel with the first load switch, a synchronization adjuster is provided that is configured to use a frequency and a voltage adjustment signal of the synchronization checker to output the converter current command value to the variable frequency power converter, and the first mode switching device is provided with a device configured to block the switching from the converter mode to the bypass mode, perform switching from the power adjuster to the synchronization adjuster, and after confirming the synchronization, cancel the blocking of the switching from the converter mode to the bypass mode.

7. The variable speed generator/motor device according to claim 1, provided with a third mode switching device configured to start and stop the gate command to the unit converters m unit converters by m unit converters (where m is a natural number equal to or larger than two) in response to the current command value from the power adjuster, and switch the current command value to the converter current adjuster at the same time as the start and the stop.

8. The variable speed generator/motor device according to claim 2, wherein an alternating current breaker is provided between the second three-phase branch circuit and the circuit load switch, and the measurement current transformer is configured to detect an overcurrent to open the alternating current breaker.

9. The variable speed generator/motor device according to claim 2, wherein a second load switch is provided between the second three-phase branch circuit and the variable frequency converter, the first mode switching device is provided with a device configured to, when switching from the converter mode to the bypass mode, block the gate command to the unit converters, and subsequently open the second load switch, and a second mode switching device is provided that is configured to, when switching from the bypass mode to the converter mode, close the second load switch, subsequently hold the current value of the current converter during the switching, calculate the current command value of the converter current adjuster from the current value and output the result, subsequently start the gate command to the unit converters, and subsequently open the first load switch.

10. The variable speed generator/motor device according to claim 2, wherein the excitation winding of the synchronous machine having an excitation winding is provided with an excitation direct current transformer, an excitation current adjuster is provided that is configured to operate the excitation device so as to match a current of the excitation direct current transformer with an excitation current command value, the first mode switching device is provided with a device configured to, when switching from the bypass mode to the converter mode, hold and use the current value of the excitation direct current transformer as a current command value of the excitation current adjuster and subsequently perform switching from the automatic voltage adjuster to the excitation current adjuster, and the second mode switching device is provided with a device configured to, when switching from the bypass mode to the converter mode, open the first load switch and then perform switching from the excitation current adjuster to the automatic voltage adjuster.

11. The variable speed generator/motor device according to claim 10, wherein a synchronization checker is provided between the first three-phase branch circuit and the second three-phase branch circuit in parallel with the first load switch, a synchronization adjuster is provided that is configured to use a frequency and a voltage adjustment signal of the synchronization checker to output the converter current command value to the variable frequency power converter, and the first mode switching device is provided with a device configured to block the switching from the converter mode to the bypass mode, perform switching from the power adjuster to the synchronization adjuster, and after confirming the synchronization, cancel the blocking of the switching from the converter mode to the bypass mode.

12. The variable speed generator/motor device according to claim 2, provided with a third mode switching device configured to start and stop the gate command to the unit converters m unit converters by m unit converters (where m is a natural number equal to or larger than two) in response to the current command value from the power adjuster, and switch the current command value to the converter current adjuster at the same time as the start and the stop.

* * * * *